US012736622B2

(12) United States Patent
Mambrilla

(10) Patent No.: US 12,736,622 B2
(45) Date of Patent: Sep. 15, 2026

(54) CALIBRATION APPARATUS AND METHOD OF VERIFYING THE POSITIONING OF A CALIBRATION DEVICE

(71) Applicant: VEHICLE SERVICE GROUP ITALY S.R.L., Ostellato (IT)

(72) Inventor: Massimo Mambrilla, Scalenghe (IT)

(73) Assignee: Vehicle Service Group Italy S.r.l., Ostellato (IT)

( * ) Notice: Subject to any disclaimer, the term of this patent is extended or adjusted under 35 U.S.C. 154(b) by 132 days.

(21) Appl. No.: 18/585,726

(22) Filed: Feb. 23, 2024

(65) Prior Publication Data

US 2024/0288544 A1 Aug. 29, 2024

(30) Foreign Application Priority Data

Feb. 23, 2023 (IT) ........................ 102023000003192

(51) Int. Cl.
*G01S 7/40* (2006.01)

(52) U.S. Cl.
CPC .................................. *G01S 7/4086* (2021.05)

(58) Field of Classification Search
CPC ..................................................... G01S 7/4086
(Continued)

(56) References Cited

U.S. PATENT DOCUMENTS 9,491,451 B2 11/2016 Pliefke
9,545,966 B2 1/2017 Kim
(Continued)

FOREIGN PATENT DOCUMENTS

CN 110542376 A 12/2019
CN 111272082 A 6/2020
(Continued)

OTHER PUBLICATIONS

Italian Search Report and Witten Opinion dated Aug. 25, 2023, for Application No. 202300003192, 7 pages.
(Continued)

*Primary Examiner* — Samarina Makhdoom
(74) *Attorney, Agent, or Firm* — FBT Gibbons LLP

(57) ABSTRACT

Method and apparatus of positioning of a calibration device for one or more sensors of a vehicle wherein a computerized system determines or knows data representative of the position and orientation of the vehicle with respect to a common reference system, and data representative of the position and orientation, with respect to the common reference system, of at least one location target directly or indirectly fixed to a base surface in front of or behind the vehicle. The computerized system is configured for: obtaining one or more detections of the location target using a sensor fixed to the calibration device; obtaining data representative of the current position and orientation of the calibration device with respect to the common reference system based on determining said data representative of the position and orientation, in the common reference system, of the location target, and said one or more detections of the location target itself obtained from the sensor fixed to said calibration device; verifying whether the current position and orientation of the calibration device are correct or not and eventually perform a step of correction of position and orientation.

23 Claims, 10 Drawing Sheets

(58) Field of Classification Search
USPC .......................................................... 342/169
See application file for complete search history.

(56) References Cited

U.S. PATENT DOCUMENTS

| | | | | |
|---|---|---|---|---|
| 2016/0103213 | A1* | 4/2016 | Ikram | G01S 13/42 342/105 |
| 2020/0239010 | A1* | 7/2020 | Corghi | B60S 5/00 |
| 2022/0042794 | A1* | 2/2022 | Cejka | G01C 15/002 |
| 2022/0057198 | A1* | 2/2022 | Massie | G01S 7/4026 |
| 2022/0189067 | A1 | 6/2022 | Vianello et al. | |
| 2022/0268885 | A1* | 8/2022 | Vianello | G01S 7/40 |

FOREIGN PATENT DOCUMENTS

| | | | | |
|---|---|---|---|---|
| CN | 112414311 | A | 2/2021 | |
| EP | 3621037 | A1 * | 3/2020 | G01S 7/4026 |
| EP | 3523604 | B1 | 5/2020 | |
| EP | 3686551 | A1 | 7/2020 | |
| EP | 4012328 | A1 | 6/2022 | |
| EP | 4050303 | A1 | 8/2022 | |
| WO | WO 2018/067354 | A1 | 4/2018 | |
| WO | WO 2021/005578 | A1 | 1/2021 | |

OTHER PUBLICATIONS

Third-Party Observation filed against European Patent Application No. 24158589.2, dated Sep. 19, 2025, 11 pages.
Dismissal of Third-Party Observation filed against European Patent Application No. 24158589.2, dated Sep. 23, 2025, 2 pages.

* cited by examiner 100
1
6
2
200
203
202
201
4
5
7
8
3a
3
3b
3a
3
3
3a
3b
3b
A
102
10
10b
10b
10
101
Z
X
Y
11
10a
10a
11
Z
X
Y
300
V
11
10
10b
10b
10
11
10a
10a
103
3a
3b
3
3b
3a
3b
3
3b
Z
X
Y
2

200
201
202
203
3
3
3
3
3
11
11
11
11
10
10
10
10
16
16
16
16
X
Y
Z
10

300
311
302
302a
302a'
302b
302b'
302c
302c'
302d'
301
303
304
305
306
307
309
308
310
313
311
312

CALIBRATION APPARATUS AND METHOD OF VERIFYING THE POSITIONING OF A CALIBRATION DEVICE

PRIORITY

This application claims priority to Italian Patent Application No. 102023000003192, filed Feb. 23, 2023, the disclosure of which is incorporated by reference herein in its entirety.

FIELD OF THE INVENTION

The present invention relates to a method of verifying the positioning of a calibration device for one or more vehicular sensors, for example for one or more vehicular sensors of an advanced driver assistance system (ADAS) of a vehicle; the invention also relates to a calibration apparatus capable of allowing the correct positioning of a calibration device being part of the apparatus with respect to a vehicle; for example, the invention may be used for the positioning, with respect to a vehicle, of a calibration device intended to calibrate one or more vehicular sensors of an advanced driver assistance system (ADAS) such as cameras or radars or others carried by the vehicle itself.

BACKGROUND ART

The use of radars, cameras and other sensors, such as LIDAR, ultrasound and infrared (IR) sensors, for determining the distance, speed and angle (height or azimuth) of objects in an environment is important in a series of vehicle safety systems, for example in advanced driver assistance systems (ADAS).

A conventional ADAS system may use one or more of the aforementioned sensors. Although these sensors are aligned and/or calibrated by the manufacturer at the production site of the vehicle and are therefore capable of providing an accurate driver assistance functionality, such sensors can require a periodic re-alignment or re-calibration, for example due to the effects of wear or misalignment due to driving conditions or an accident, such as a collision.

For this purpose, there are known calibration devices comprising support structures of one or more targets, for example in the form of panels provided with known graphic patterns or in the form of electromagnetic wave reflectors. Such calibration devices are used in the alignment and calibration procedures of the aforementioned sensors for advanced driver assistance systems.

For example, the International patent application WO2018/067354A1 shows a structure on which are mounted an optical target for calibrating a camera of a vehicle and a metallic target for calibrating a radar sensor of the vehicle. Before performing the calibration procedure, for example, of a camera or an ADAS radar, a support structure of the necessary targets must be positioned precisely in a position in front of (or behind) the vehicle, at a predetermined distance and with a predetermined orientation with respect to a reference of the vehicle itself (which can for example be constituted by the longitudinal symmetry axis or the thrust axis, or the front axle, or the logo present on the bonnet or the front).

The optimal distance and orientation angles for allowing the calibration are indicated by vehicle manufacturers. It is evident that the precise positioning of the support structure with the calibration targets is fundamental for obtaining a proper calibration of the ADAS sensors.

For this purpose, solutions in charge of assisting a user in positioning ADAS sensor calibration devices are known. Such solutions typically use cameras, distance meters, inclinometers and/or other on-board sensors of the calibration device that allow measurement of the distance and the inclination of the calibration device with respect to a reference point of the vehicle.

Examples of these solutions are described in the international application WO2021005578A1 and in the patent EP3523604B1 which show systems for aligning a calibration device with a vehicle whose ADAS systems must be calibrated.

The above-described known solutions require rather complex on-board detection systems of the calibration device and/or positioning procedures.

In particular, to opportunely detect the positioning and the orientation of the calibration device with respect to the vehicle, various sensors are needed such as, for example, cameras, distance meters, inclinometers, or other members operating on the calibration device, determining a considerable complexity of the calibration device and its positioning procedure. In addition, the aforementioned sensors must be placed on the calibration device in positions apart from each other, negatively impacting the transversal encumbrance of the calibration device.

OBJECT OF THE INVENTION

Object of the present invention is therefore to overcome at least one of the drawbacks and/or limitations of the previous solutions.

In particular, it is an object of the present invention to provide a new method and a new apparatus capable of ensuring the correct positioning of a calibration device with respect to a vehicle that are easy and practical to implement.

Another object of the present invention is to provide a new method and a new apparatus for the positioning of a calibration device with respect to a vehicle that require a reduced number of sensors. An auxiliary object of the present invention is to provide a new method and a new apparatus for the positioning of a calibration device that require reduced spaces for the installation.

An additional object of the present invention is to provide a new method and a new apparatus for the positioning of a calibration device with respect to a vehicle that are optimally suited for calibrating one or more sensors, such as, for example, cameras or radars present on-board in modern vehicles.

SUMMARY

One or more of the above-indicated objects are substantially achieved by an apparatus and a method according to one or more of the attached claims and/or the following aspects.

Aspects of the finding are described below.

In a 1st aspect, it is provided a method of verifying the positioning of a calibration device (2) for one or more vehicular sensors, for example, for one or more vehicular sensors of an advanced driver assistance system (ADAS) of a vehicle (V), wherein the vehicle (V) is positioned in a respective control area (103) and wherein the calibration device (2) is positioned in front of or behind with respect to the vehicle (V), said method being implemented by a computerized system (200) including at least one electronic processor (201) and configured for determining or knowing:

data representative of the position and orientation of the vehicle (V) with respect to a common reference system (XYZ), data representative of the position and orientation, with respect to said common reference system (XYZ), of at least one location target (3) directly or indirectly fixed to a base surface (102) in front of or behind the vehicle (V), between the control area (103) and the calibration device (2), said method of verifying the positioning including the steps of:

obtaining one or more detections of the at least one location target (3) using a sensor (5) fixed to said calibration device (2), obtaining data representative of the current position and orientation of the calibration device (2) with respect to said common reference system (XYZ) based on:

(determination or knowledge of) said data representative of the position and orientation, in the common reference system (XYZ), of the at least one location target (3), and said one or more detections of the at least one location target (3) obtained from the sensor (5) fixed to said calibration device (2), verifying whether the current position and orientation of the calibration device (2) are correct or not based on:

said data representative of the current position and orientation of the calibration device (2) in said common reference system (XYZ), said data representative of the position and orientation of the vehicle (V) in the common reference system (XYZ), and reference values or ranges establishing a correct position and orientation of the calibration device (2) with respect to the vehicle (V).

In a 2nd aspect, according to the preceding aspect, the sensor (5) fixed to said calibration device (2) comprises one or more optical sensors fixed to the calibration device (2), and wherein:

the step of obtaining one or more detections of the at least one location target (3) using a sensor (5) fixed to said calibration device (2) consists of obtaining one or more images of the at least one location target (3) using said one or more optical sensors fixed to said calibration device (2), said step of obtaining data representative of the current position and orientation of the calibration device (2) with respect to said common reference system (XYZ) is performed based on determining:

said data representative of the position and orientation, in the common reference system (XYZ), of the at least one location target (3), and said one or more images of the at least one location target (3) obtained from said one or more optical sensors fixed to said calibration device (2).

In a 3rd aspect, according to the 1st or the 2nd aspect, it is provided to determine data representative of the relative position and orientation of the calibration device (2) with respect to the at least one location target (3) based on:

said one or more detections of the at least one location target (3) obtained from the sensor (5) fixed to said calibration device (2), or said one or more images of the at least one location target (3) obtained from said one or more optical sensors fixed to said calibration device (2);

and wherein the step of obtaining data representative of the current position and orientation of the calibration device (2) with respect to said common reference system (XYZ) is performed based on:

said data representative of the position and orientation, in the common reference system (XYZ), of said at least one location target (3), and said data representative of the relative position and orientation of the calibration device (2) with respect to the at least one location target (3).

In a 4th aspect, according to any one of the preceding aspects, the at least one location target (3) comprises two or more location targets (3) and wherein said method provides for:

obtaining one or more detections of two or more location targets (3) directly or indirectly fixable to the base surface (102), between the control area (103) and the calibration device (2), in front of the vehicle (V); or obtaining one or more detections of two or more location targets (3) directly or indirectly fixable to the base surface (102), between the control area (103) and the calibration device (2), behind the vehicle (V);

wherein the method provides also for:

optionally determining data representative of the relative position and orientation of the calibration device (2) with respect to said two or more location targets, obtaining current position and orientation of the calibration device (2) in said common reference system (XYZ) based on:

said one or more detections of the two or more location targets (3) obtained from the sensor (5) fixed to said calibration device (2), said data representative of position and said orientation, in the common reference system (XYZ), of said two or more location targets (3), and optionally said data representative of the relative position and orientation of the calibration device (2) with respect to the two or more location targets (3).

In a 5th aspect, according to any one of the preceding aspects, each of said location targets (3) is of planar shape and has an exposed surface provided with a plurality of prefixed graphic elements, optionally arranged in a checkerboard pattern, each of the prefixed graphic elements having known position and orientation on said exposed surface.

In a 6th aspect, according to the 4th and the 5th aspect, said two or more location targets (3) are directly or indirectly fixed to the base surface (102) between the control area (103) and the calibration device (2), so as to result spaced apart and aligned with each other.

In a 7th aspect, according to any one of the preceding aspects, when combined with the 2nd aspect, the calibration device (2) comprises a support frame and said one or more optical sensors are constrained to the support frame, each optical sensor being arranged and oriented so that the field of view of the optical sensor itself frames the at least one location target (3).

In an 8th aspect, according to the preceding aspect, the calibration device (2) comprises a support frame and said one or more optical sensors are constrained to the support frame, each optical sensor being arranged and oriented so that the field of view of the optical sensor itself frames all the location targets (3) in front of the vehicle (V) or all the location targets (3) behind the vehicle (V); and wherein:

the step of obtaining one or more detections of the at least one location target (3) using a sensor (5) fixed to said calibration device (2) consists of obtaining one or more images of all the location targets (3) using said one or more optical sensors fixed to said calibration device (2), said step of obtaining data representative of the current position and orientation of the calibration device (2) with respect to said common reference system (XYZ) is performed based on determining:

said data representative of the position and orientation, in the common reference system (XYZ), of all the location targets (3), and said one or more images of all the location targets (3) obtained from said one or more optical sensors fixed to said calibration device (2).

In a 9th aspect, according to the 7th or the 8th aspect, each of said one or more optical sensors is positioned centrally, at a vertical centerline plane (6) of the support frame of the calibration device (2).

In a 10th aspect, according to any one of the preceding aspects, said advanced driver assistance system of the vehicle (V) present in the control area (103) comprises at least one ADAS sensor, for example an ADAS camera, wherein the calibration device (2) comprises a calibration element for calibrating of the ADAS sensor, for example a calibration panel (7) configured for calibrating said at least one ADAS camera, and wherein the calibration element, for example the calibration panel (7), is positionable so that said at least one ADAS camera frames in its field of view said calibration panel (7).

In a sub-aspect, the calibration panel (7) has on a surface intended to face the ADAS camera a plurality of graphical elements of known position, orientation, and geometry.

In a 11th aspect, according to any one of the preceding aspects, said advanced driver assistance system of the vehicle (V) present in the control area (103) comprises at least one further ADAS sensor, for example an ADAS radar, wherein the calibration device (2) comprises a further calibration element for calibrating the further ADAS sensor, for example a reflective panel (8) configured for reflecting electromagnetic waves emitted by said ADAS radar to calibrate the ADAS radar.

In a 12th aspect, according to the 10th or the 11th aspect, the step of obtaining data representative of the current position and orientation of the calibration device (2) in said common reference system (XYZ) comprises determining, with respect to said common reference system (XYZ), measured values of one or more location parameters chosen among:

height of the calibration panel (7) and/or of the reflective panel (8) (and/or of other calibration element carried by the calibration device (2) and useful for calibrating an ADAS sensor of the vehicle V) with respect to the base surface (102), distance of a predetermined point of the calibration panel (7) and/or of the reflective panel (8) (and/or of other calibration element carried by the calibration device (2) and useful for calibrating an ADAS sensor) with respect to a prefixed characteristic element of the vehicle (V) present in the control area (103), optionally at a distance of a predetermined point of the calibration panel (7) and/or of the reflective panel (8) (and/or of other calibration element carried by the calibration device (2) and useful for calibrating an ADAS sensor) with respect to the vehicle front axle (V) or to the logo on the front of the vehicle (V), and one or more tilt angles of the calibration panel (7) and/or of the reflective panel (8) (and/or of other calibration element carried by the calibration device (2) and useful for calibrating an ADAS sensor) with respect to the common reference system (XYZ) or to a reference system of the vehicle (V) obtainable from the common one, optionally wherein the tilt angles comprise the tilt angles of a plane fixed to the calibration panel (7) and/or to the reflective panel (8) (and/or with other calibration element carried by the calibration device (2) and useful for calibrating an ADAS sensor) with respect to each of the orthogonal planes defined by said common reference system (XYZ) or by said reference system of the vehicle (V).

In a 13th aspect, according to the 12th aspect, the step of verifying whether the current position and orientation of the calibration device (2) are correct or not comprises:

comparing the measured values of said one or more location parameters with respective reference values or ranges, and generating one or more respective error signals if there are discrepancies between one or more measured values of said one or more location parameters and the respective reference values or ranges.

In a 14th aspect, according to the 13th aspect, the method comprises the further steps of:

commanding a correction procedure that brings the one or more measured values to meet the respective reference values or ranges, and/or generating for each of said one or more error signals a respective optical signal on a screen of a user interface connected to the electronic processor (201), each said optical signal having at least one property related to the respective error signal.

In a 15th aspect, according to any one of the preceding aspects, including the step of determining data representative of the position and orientation of the vehicle (V) with respect to the common reference system (XYZ).

In a 16th aspect, according to the preceding aspect, the step of determining data representative of the position and orientation of the vehicle (V) with respect to the common reference system (XYZ) provides for determining data representative of the position and orientation with respect to said common reference system (XYZ) of at least one characteristic element for each side of the vehicle (V) using for each side of the vehicle (V):

one or more reference targets (10), in a fixed position with respect to the base surface (102), lateral to the control area (103) where the vehicle (V) is positioned, and one or more image detectors (11) positioned lateral to the control area (103), optionally stably or removably constrained to the base surface (102);

wherein each of said image detectors (11) is positioned in proximity to a respective reference target (10), and wherein each pair formed by an image detector and the respective reference target (10) is configured so that the image detector has a field of view framing both the respective reference target (10) and at least a respective portion of the side of the vehicle (V) present in said control area (103).

In a 17th aspect, according to the preceding aspect, said step of determining for each side of the vehicle (V) data representative of the position and orientation of at least one characteristic element of the vehicle (V) with respect to the common reference system (XYZ), also includes, for each pair formed by image detector and respective reference target (10):

detecting with said image detector one or more images of said at least one portion of the side of the vehicle (V), detecting with said image detector one or more images of the respective reference target (10), obtaining data representative of the position and orientation of said at least one characteristic element of the vehicle (V) in the common reference system (XYZ) based on:

said one or more images of said at least one portion of the side of the vehicle (V), and said one or more images of the respective reference target (10).

In a 18th aspect, according to the 16th or the 17th aspect, said step of determining for each side of the vehicle (V) data representative of the position and orientation of at least one characteristic element of the vehicle (V), with respect to the common reference system (XYZ), also includes, for each pair formed by image detector and respective reference target (10):

detecting with said image detector one or more images of said at least one portion of the side of the vehicle (V), detecting with said image detector one or more images of the respective reference target (10), obtaining data representative of the position and orientation of said at least one characteristic element of the vehicle (V) in the common reference system (XYZ) based on:

said data representative of the position and orientation, in said common reference system (XYZ), of the reference target (10) of the pair formed by image detector and respective reference target (10), said one or more images of said at least one portion of the side of the vehicle (V), and said one or more images of the respective reference target (10).

In a 19th aspect, according to the 17th or the 18th aspect, the step of obtaining data representative of the position and orientation of said at least one characteristic element of the vehicle (V) in the common reference system (XYZ) provides, for each pair formed by image detector and respective reference target (10), for:

in first instance, determining data representative of the position and orientation of the characteristic element of the vehicle (V) with respect to the image detector based on the one or more images of said at least one portion of the side of the vehicle (V), as well as determining data representative of the position and orientation of the reference target (10) with respect to the image detector based on said one or more images of the respective reference target (10), and subsequently, determining data representative of the position and orientation of said at least one characteristic element of the vehicle (V) in the common reference system (XYZ) based on what was determined in first instance and the data representative of the position and orientation, in said common reference system (XYZ), of the reference target (10) of the pair formed by image detector and by respective reference target (10).

In a $19th_{bis}$ aspect according to the 18th or the 19th aspect, the electronic processor (201) knows position and orientation, in said common reference system (XYZ), of the one or more reference targets (10) placed lateral to each longitudinal side of the control area (103); or wherein the method comprises an initial procedure of determining data representative of the position and orientation, in said common reference system (XYZ), of the one or more reference targets (10) placed lateral to each longitudinal side of the control area (103).

In a $19th_{ter}$ aspect, according to the preceding aspect, said initial procedure comprises:

observing each of said one or more reference targets (10) with one or more dedicated image detectors (15), placed in known position and orientation in the common reference system (XYZ), detecting, with these one or more dedicated image detectors (15), respective one or more images of the reference targets (10), determining, based on the position and orientation in the common reference system (XYZ) of said one or more dedicated image detectors (15) and of the one or more images detected by them of each reference target (10), data representative of the position and orientation in said common reference system (XYZ) of the one or more reference targets (10) placed on each longitudinal side of the control area (103), and optionally wherein said one or more dedicated image detectors (15) are positioned in an elevated area with respect to the top of the vehicle (V) and/or capable of framing in its field of view each of the reference targets (10);

or positioning one or more known common targets (16) in a known position and orientation with respect to the common reference system (XYZ), said one or more common targets (16) being viewable by image detectors (11), detecting with these one or more image detectors (11) respective images of the one or more common targets (16), determining, based on the images detected by the image detectors (11) of the one or more common targets (16), data representative of the position and orientation in the common reference system (XYZ) of said one or more image detectors (11), and deriving then data representative of the position and orientation of each reference target (10) in the common reference system (XYZ) based on one or more images of the respective reference target (10) detected by the corresponding image detector of each pair optionally, wherein said one or more common targets (16) are positioned in an elevated area with respect to the top of the vehicle (V) and/or in a position capable of being framed in the field of view of each of the image detectors (11).

In a 20th aspect, according to any one of the preceding aspects, the step of determining data representative of the position and orientation of said vehicle (V) with respect to the common reference system (XYZ) includes obtaining data representative of the position and orientation in the common reference system (XYZ) of at least one/said characteristic element for each side of the vehicle (V).

In a 21st aspect, according to any one of the preceding aspects, said at least one characteristic element of the vehicle (V) includes one or more of:

a right front wheel of the vehicle (V), a right rear wheel of the vehicle (V), a left front wheel of the vehicle (V), and a left rear wheel of the vehicle (V), and wherein determining the data representative of the position and orientation of said at least one characteristic element of the vehicle (V), with respect to the common reference system (XYZ), includes determining with respect said common reference system (XYZ) the measured values assumed by a set of positional parameters chosen among:

position and orientation of a right front wheel of the vehicle (V), position and orientation of a right rear wheel of the vehicle (V), position and orientation of a left front wheel of the vehicle (V), position and orientation of a left rear wheel of the vehicle (V), position and orientation of a left front wheel and a right front wheel of the vehicle (V), position and orientation of a left rear wheel and a right rear wheel of the vehicle (V), position and orientation of a left front wheel and a right front wheel of the vehicle (V), and position and orientation of a left rear wheel and a right rear wheel of the vehicle (V).

In a 21st$_{bis}$ aspect, according to any one of the two preceding aspects, the step of determining data representative of the position and orientation of said vehicle (V) with respect to the common reference system (XYZ) comprises determining with respect to said common reference system (XYZ) the measured values assumed by a set of additional positional parameters chosen among:

position and orientation of a vehicle rear axle (V), position and orientation of the longitudinal centerline of said vehicle (V), position and orientation of the thrust axis of said vehicle (V), position of a predetermined element of the vehicle (V) or fixed to the vehicle (V), position and orientation of each front wheel of the vehicle (V) and position and orientation of each rear wheel of said vehicle (V), position and orientation of a vehicle front axle (V) and position and orientation of a vehicle rear axle (V), position and orientation of the longitudinal centerline of said vehicle (V), and position and orientation of the thrust axis of said vehicle (V), position and orientation of each front wheel of the vehicle (V), position and orientation of each rear wheel of said vehicle (V), position and orientation of a vehicle front axle (V), position and orientation of a vehicle rear axle (V), and position and orientation of each front wheel of the vehicle (V), position and orientation of each rear wheel of said vehicle (V), position and orientation of a vehicle front axle (V), position and orientation of a vehicle rear axle (V), position and orientation of the longitudinal centerline of said vehicle (V), position and orientation of the thrust axis of said vehicle (V).

In a 22nd aspect, according to any one of the two preceding aspects, the method includes the additional steps of:

determining a reference system fixed to the vehicle (V) having at least two reference axes lying on a vertical plane through the longitudinal centerline of the vehicle (V) and a third axis perpendicular to said vertical plane, and re-calculating the measured values of said set of positional parameters and/or of said set of additional positional parameters with respect to the reference system fixed the vehicle (V).

In a 23rd aspect, according to the preceding aspect, the method includes performing an alignment procedure that provides for:

comparing one or more measured values of said set of positional parameters and/or of said set of additional positional parameters determined with respect to the reference system fixed to the vehicle (V) with a corresponding set of reference values or ranges, determining possible discrepancies among one or more measured values of said set of positional parameters and/or of said set of additional positional parameters and respective one or more reference values or ranges, and in case there are discrepancies among one or more measured values of said set of positional parameters and/or of said set of additional positional parameters and respective one or more reference values or ranges, commanding the execution or performing a correction procedure that brings the one or more measured values of said set of positional parameters and/or of said set of additional positional parameters determined with respect to the reference system fixed to the vehicle (V) to meet the respective one or more optimal values or ranges.

In a 24th aspect, according to any one of the preceding aspects, each image detector comprises two or more cameras mounted in a known and fixed relative position on a same rigid support, so that the distance between the two or more cameras and relative orientation of the optical axes of the two or more cameras of the same image detector are predetermined and known, wherein the two or more cameras of a same image detector cooperate with each other capturing images of the same respective portion of side of the vehicle (V), so as to define a multi-ocular stereo vision system, and wherein at least one of the two cameras of a same image detector frames both the respective portion of the side of the vehicle (V) and the respective reference target (10).

In a 25th aspect, according to the preceding aspect, at least one of the two cameras of a same image detector frames both the respective side of the vehicle (V) and the respective reference target (10) and simultaneously captures both an image of the respective reference target (10) and the respective portion of the side of the vehicle (V).

In a 26th aspect, according to any one of the preceding aspects, in combination with the 16th aspect, each reference target (10) is a target of planar shape having an exposed surface provided with a plurality of prefixed graphic elements, optionally arranged in a checkerboard pattern, each of the prefixed graphic elements having known position and orientation on said exposed surface.

In a 27th aspect, according to the preceding aspect, for each image detector is provided:

a plate shaped element, fixed or fixable on the base surface (102) in a position adjacent to one side of the vehicle (V), having an upper surface where it is arranged the respective reference target (10), a column superiorly coupled to the plate shaped element and emerging, optionally, in the vertical direction, from the plate shaped element, wherein said image detector is stably coupled to said column and is configured so as to capture the image of the reference target (10) present on the underlying plate shape element, and optionally, wherein the column is removably coupled to the plate shaped element.

In a 27th$_{bis}$ aspect, according to the 24th and 27th aspects, said column defines the rigid support to which the two or more cameras of a same image detector are fixed, said cameras being placed in spaced apart positions, optionally vertically spaced, from each other.

In a 28th aspect, according to any one of the preceding aspects, are provided two or more location targets (3) spaced apart from each other and positioned or in front of or behind the vehicle (V) between the control area (103) and the calibration device (2), and wherein determining data representative of the position and orientation, in said common reference system (XYZ), of at least one location target (3) comprises determining data representative of the position and orientation, in said common reference system (XYZ), of each of said location target (3).

In a 29th aspect, according to any one of the preceding aspects, the step of determining data representative of the position and orientation, in said common reference system (XYZ), of each location target (3) comprises performing a procedure including:

- observing each of said one or more location targets (3) with one or more dedicated image detectors (15), placed in known position and orientation in the common reference system (XYZ),
- detecting, with said one or more dedicated image detectors (15), respective one or more images of each location target (3), and
- determining, based on the position and orientation in the common reference system (XYZ) of said one or more dedicated image detectors (15) and the respective one or more images detected by them of each location target (3), the data representative of the position and orientation in said common reference system (XYZ) of each of the location targets (3);

optionally, wherein said one or more dedicated image detectors (15) are positioned in an elevated area with respect to the top of the vehicle (V) and/or capable of framing in its field of view each of the location targets (3);

or determining position and orientation, in said common reference system (XYZ), of each location target (3) comprises performing a procedure including:

- positioning one or more known common targets (16) in a known position and orientation with respect to the common reference system (XYZ), said one or more known common targets (16) being viewable by image detectors (11),
- detecting with said one or more image detectors (11) respective images of the one or more known common targets (16), determining, based on the images detected by the image detectors (11) of the one or more common targets (16), data representative of the position and orientation in the common reference system (XYZ) of said one or more image detectors (11), and
- deriving then data representative of the position and orientation of each location target (3) in the common reference system (XYZ) based on one or more images of said location target (3) detected by the one or more image detectors (11);

optionally, wherein said one or more common targets (16) are positioned in an elevated area with respect to the top of the vehicle (V) and/or in a position capable of being framed in the field of view of each of the image detectors (11).

In a 30th aspect, according to any one of the preceding aspects, the step of determining data representative of the position and orientation, in said common reference system (XYZ), of at least one location target (3), is performed one-off during initial calibration of the apparatus and not repeated for each positioning of a calibration device (2) with respect to the respective vehicle (V) positioned in the control area (103).

In a 31st aspect, according to any one of the preceding aspects, in combination with the 19th$_{bis}$ aspect, the initial procedure of determining data representative of the position and orientation, in said common reference system (XYZ), of the one or more reference targets (10) placed lateral to each longitudinal side of the control area (103) is performed one-off (or at least once) during initial calibration of the apparatus and not repeated for each positioning of a calibration device (2) with respect to the respective vehicle (V) positioned in the control area (103).

In a 32nd aspect, it is provided a calibration apparatus for one or more vehicular sensors, for example for one or more vehicular sensors of an advanced driver assistance system (ADAS) of a vehicle (V), said calibration apparatus including:

- a calibration device (2) positionable in front of or behind with respect to a vehicle (V) present in a respective control area (103),
- a computerized system (200) including an electronic processor (201), said electronic processor (201) being configured for performing the following steps:
  - receiving or determining data representative of the position and orientation of at least one characteristic element of the vehicle (V) with respect to a common reference system (XYZ),
  - receiving or determining data representative of the position and orientation, in said common reference system (XYZ), of at least one location target (3) that can be directly or indirectly fixed to a base surface (102), in front of or behind the vehicle (V), between the control area (103) and the calibration device (2),
  - obtaining one or more detections of the at least one location target (3) using a sensor (5) fixed to said calibration device (2),
  - obtaining data representative of the current position and orientation of the calibration device (2) with respect to said common reference system (XYZ) based on:
    - (determination or knowledge of) said data representative of the position and orientation, in the common reference system (XYZ), of the at least one location target (3), and
    - said one or more detections of the at least one location target (3) obtained from the sensor (5) fixed to said calibration device (2),
  - verifying whether the current position and orientation of the calibration device (2) are correct or not based on:
    - said data representative of the current position and orientation of the calibration device (2) in said common reference system (XYZ),
    - said data representative of the position and orientation of the at least one characteristic element of the vehicle (V) in the common reference system (XYZ), and
    - reference values or ranges establishing a correct position and orientation of the calibration device (2) with respect to the vehicle (V).

In a 33rd aspect, according to the preceding aspect, the sensor (5) fixed to said calibration device (2) comprises one or more optical sensors fixed to the calibration device (2), and wherein:

- the step of obtaining one or more detections of the at least one location target (3) using a sensor (5) fixed to said calibration device (2) comprises obtaining one or more images of the at least one location target (3) using said one or more optical sensors fixed to said calibration device (2), and
- said step of obtaining data representative of the current position and orientation of the calibration device (2) with respect to said common reference system (XYZ) is performed based on determining:

said data representative of the position and orientation, in the common reference system (XYZ), of the at least one location target (3), and said one or more images of the at least one location target (3) obtained from said one or more optical sensors fixed to said calibration device (2).

In a 34th aspect, according to the 32nd or the 33rd aspect, the electronic processor (201) is configured for determining data representative of the relative position and orientation of the calibration device (2) with respect to the at least one location target (3) based on:

said one or more detections of the at least one location target (3) obtained from the sensor (5) fixed to said calibration device (2), or said one or more images of the at least one location target (3) obtained from said one or more optical sensors fixed to said calibration device (2);

and wherein the step of obtaining data representative of the current position and orientation of the calibration device (2) with respect to said common reference system (XYZ) is performed based on:

said data representative of the position and orientation, in the common reference system (XYZ), of said at least one location target (3), and said data representative of the relative position and orientation of the calibration device (2) with respect to the at least one location target (3).

In a 35th aspect, according to any one of the preceding aspects from the 32nd to the 34th, the at least one location target (3) comprises two or more location targets (3) and wherein said electronic processor (201) is configured for:

obtaining one or more detections of two or more location targets (3) directly or indirectly fixable to the base surface (102), between the control area (103) and the calibration device (2), in front of the vehicle (V); or obtaining one or more detections, of two or more location targets (3) directly or indirectly fixable to the base surface (102), between the control area (103) and the calibration device (2), behind the vehicle (V), optionally determining data representative of the relative position and orientation of the calibration device (2) with respect to said two or more location targets (3), and obtaining data representative of the current position and orientation of the calibration device (2) in said common reference system (XYZ) based on:

said one or more detections of two or more location targets (3) obtained from the sensor (5) fixed to said calibration device (2), data representative of the position and orientation, in the common reference system (XYZ), of two or more location targets (3), and optionally said data representative of the relative position and orientation of the calibration device (2) with respect to said two or more location targets (3).

In a 36th aspect, according to any one of the preceding aspects from the 32nd to the 35th, the apparatus comprises said location target(s) (3), each of said location targets (3) being a target of planar shape and having an exposed surface provided with a plurality of prefixed graphic elements, optionally arranged in a checkerboard pattern, each of the prefixed graphic elements having known position and orientation on said exposed surface.

In a 37th aspect, according to the 35th and the 36th aspect, said two or more location targets (3) are directly or indirectly fixed to the base surface (102) between the control area (103) and the calibration device (2), so as to result spaced apart and aligned with each other.

In a 38th aspect, according to any one of the preceding aspects from the 32nd to the 37th, in combination with the 32nd aspect, the calibration device (2) comprises a support frame and wherein said one or more optical sensors are constrained to the support frame, each optical sensor being arranged and oriented so that the field of view of the optical sensor itself frames the at least one location target (3), optionally all the location targets (3) in front of the vehicle (V) or all the location targets (3) behind the vehicle (V).

In a 39th aspect, according to the preceding aspect, the calibration device (2) comprises a support frame and wherein said one or more optical sensors are constrained to the support frame, each optical sensor being arranged and oriented so that the field of view of the optical sensor itself frames all the location targets (3) in front of the vehicle (V) or all the location targets (3) behind the vehicle (V); and wherein:

the step of obtaining one or more detections of the at least one location target (3) using a sensor (5) fixed to said calibration device (2) comprises obtaining one or more images of all the location target (3) using said one or more optical sensors fixed to said calibration device (2), said step of obtaining data representative of the current position and orientation of the calibration device (2) with respect to said common reference system (XYZ) is performed based on determining:

said data representative of the position and orientation, in the common reference system (XYZ), of all the location targets (3), and said one or more images of all the location targets (3) obtained from said one or more optical sensors fixed to said calibration device (2).

In a 40th aspect, according to the 38th or the 39th aspect, each of said one or more optical sensors is centrally positioned, at a vertical centerline plane (6) of the support frame of the calibration device (2).

In a 41st aspect, according to any one of the preceding aspects from the 32nd to the 40th, the advanced guidance system of the vehicle (V) present in the control area (103) comprises at least one ADAS sensor, for example an ADAS camera, wherein the calibration device (2) comprises a calibration element of the mentioned ADAS sensor, for example a calibration panel (7) to calibrate said at least one ADAS camera, and wherein the calibration element of the ADAS sensor, for example the calibration panel (7), is positionable so that said ADAS sensor i.e. said at least one ADAS camera sees or frames in its field of view said calibration element i.e. said calibration panel (7); in a sub-aspect the calibration element comprises the calibration panel (7) that has on a surface intended to face the ADAS camera a plurality of graphical elements of known position, orientation, and geometry.

In a 42nd aspect, according to any one of the preceding aspects from the 32nd to the 41st, the advanced driving system of the vehicle (V) present in the control area (103) comprises an additional ADAS sensor, for example at least one ADAS radar; in this case the calibration device (2) comprises an additional calibration element for example a reflective panel (8) configured for reflecting electromagnetic waves emitted by said ADAS radar to calibrate said at least one ADAS radar.

In a 43rd aspect, according to the 41st or the 42nd aspect, wherein obtaining data representative of the current position and orientation of the calibration device (2) in said common reference system (XYZ) comprises determining, with respect to said common reference system (XYZ), measured values of one or more location parameters chosen among:

height of the calibration panel (7) and/or of the reflective panel (8) (and/or of other calibration element carried by the calibration device (2) and useful for calibrating an ADAS sensor) with respect to the base surface (102), distance of a predetermined point of the calibration panel (7) and/or of the reflective panel (8) (and/or of another calibration element carried by the calibration device (2) and useful for calibrating an ADAS sensor) with respect to a prefixed characteristic element of the vehicle (V) present in the control area (103), optionally distance of a predetermined point of the calibration panel (7) and/or of the reflective panel (8) (and/or of another calibration element carried by the calibration device (2) and useful for calibrating an ADAS sensor) with respect to the vehicle front axle (V) or to the logo on the front of the vehicle (V), and one or more tilt angles of the calibration panel (7) and/or of the reflective panel (8) (and/or of another calibration element carried by the calibration device (2) and useful for calibrating an ADAS sensor) with respect to the common reference system (XYZ) or to a reference system of the vehicle (V) obtainable from the common reference system, optionally wherein the tilt angles comprise the tilt angles of a plane fixed to the calibration panel (7) and/or to the reflective panel (8) (and/or to another calibration element carried by the calibration device (2) and useful for calibrating an ADAS sensor) with respect to each of the orthogonal planes defined by said common reference system (XYZ) or by said reference system of the vehicle (V).

In a 44th aspect, according to the preceding aspect, the step of verifying whether the current position and orientation of the calibration device (2) are correct or not comprises:

comparing the measured values of said one or more location parameters with respective reference values or ranges, and generating one or more respective error signals if there are discrepancies between one or more measured values of said one or more location parameters and the respective reference values or ranges.

In a 45th aspect, according to the preceding aspect, the electronic processor (201) is configured for:

commanding a correction procedure that brings the one or more measured values to meet the respective reference values or ranges, and/or generating for each of said one or more error signals a respective optical signal on a screen of a user interface connected to the electronic processor (201), each said optical signal having at least one property related to the respective error signal.

In a 46th aspect, according to any one of the preceding aspects from the 32nd to the 45th, the electronic processor (201) is configured for determining data representative of the position and orientation of the at least one characteristic element of the vehicle (V), with respect to a common reference system (XYZ).

In a 47th aspect, according to the preceding aspect, the apparatus comprises:

one or more reference targets (10), directly or indirectly fixable to the base surface (102), lateral with respect to the control area (103) where the vehicle (V) is positioned, and one or more image detectors (11), directly or indirectly fixable to the base surface (102), lateral with respect to the control area (103), in proximity to a respective reference target (10), and wherein each pair formed by an image detector and the respective reference target (10) is configured so that the image detector has a field of view framing both the respective reference target (10) and at least a respective portion of the side of the vehicle (V) present in said control area (103).

In a 48th aspect, according to the preceding aspect, the step of determining data representative of the position and orientation of at least one characteristic element of the vehicle (V), with respect to the common reference system (XYZ), also includes, for each pair formed by image detector and respective reference target (10):

detecting with said image detector one or more images of said at least one portion of the side of the vehicle (V), detecting with said image detector one or more images of the respective reference target (10), and obtaining data representative of the position and orientation of said at least one characteristic element of the vehicle (V) in the common reference system (XYZ) based on:

said one or more images of said at least one portion of the side of the vehicle (V), and said one or more images of the respective reference target (10).

In a 49th aspect, according to the 47th or the 48th aspect, the step of determining data representative of the position and orientation of at least one characteristic element of the vehicle (V), with respect to the common reference system (XYZ), also includes, for each pair formed by image detector and respective reference target (10):

detecting with said image detector one or more images of said at least one portion of the side of the vehicle (V), detecting with said image detector one or more images of the respective reference target (10), obtaining data representative of the position and orientation of said at least one characteristic element of the vehicle (V) in the common reference system (XYZ) based on:

said data representative of the position and orientation, in said common reference system (XYZ), of the reference target (10) of the pair formed by image detector and respective reference target (10), said one or more images of said at least one portion of the side of the vehicle (V), and said one or more images of the respective reference target (10).

In a 50th aspect, according to the 48th or the 49th aspect, wherein obtaining data representative of the position and orientation of said at least one characteristic element of the vehicle (V) in the common reference system (XYZ) provides, for each pair formed by image detector and respective reference target (10), for:

in first instance, determining data representative of the position and orientation of the characteristic element of the vehicle (V) with respect to the image detector based on the one or more images of said at least one portion of the side of the vehicle (V), as well as determining data representative of the position and orientation of the reference target (10) with respect to the image detector based on said one or more images of the respective reference target (10), and subsequently, determining data representative of the position and orientation of said at least one characteristic element of the vehicle (V) in the common reference system (XYZ) based on what was determined in first instance and the data representative of the position and orientation, in said common reference system (XYZ), of the reference target (10) of the pair formed by image detector and by respective reference target (10).

In a 50th$_{bis}$ aspect, according to the 49th or the 50th aspect, the electronic processor (201) is configured for knowing position and orientation, in said common reference system (XYZ), of the one or more reference targets (10) placed lateral to each longitudinal side of the control area (103); or wherein said electronic processor (201) is configured also for performing an initial procedure of determining data representative of the position and orientation, in said common reference system (XYZ), of the one or more reference targets (10) placed lateral to each longitudinal side of the control area (103).

In a 50th$_{ter}$ aspect, according to the preceding aspect, the apparatus comprises one or more dedicated image detectors (15), placed in known position and orientation in the common reference system (XYZ), and wherein said initial procedure comprises:

- observing each of said one or more reference targets (10) with the one or more dedicated image detectors (15),
- detecting, with said one or more dedicated image detectors (15), one or more respective images of the reference targets (10),
- determining, based on the position and orientation in the common reference system (XYZ) of said one or more dedicated image detectors (15) and of the one or more images detected by them of each reference target (10), data representative of the position and orientation in said common reference system (XYZ) of the one or more reference targets (10) placed on each longitudinal side of the control area (103), and
- optionally wherein said one or more dedicated image detectors (15) are positioned in an elevated area with respect to the control area (103) and to the base surface (102) and/or are configured for framing in its field of view each of the reference targets (10);

or the apparatus comprises one or more known common targets (16), located in known position and orientation with respect to the common reference system (XYZ), said one or more common targets (16) being viewable by image detectors (11), and wherein said initial procedure comprises:

- detecting with said one or more image detectors (11) respective images of the one or more common targets (16),
- determining, based on the images detected by the image detectors (11) of the one or more common targets (16), data representative of the position and orientation in the common reference system (XYZ) of said one or more image detectors (11), and
- deriving then data representative of the position and orientation of each reference target (10) in the common reference system (XYZ) based on one or more images of the respective reference target (10) detected by the corresponding image detector of each pair;
- optionally wherein said one or more common targets (16) are positioned in an elevated area with respect to the control area (103) and to the base surface (102) and/or in a position capable of being framed in the field of view of each of the image detectors (11).

In a 51st aspect, according to any one of the preceding aspects of the apparatus, the step of determining data representative of the position and orientation of said at least one characteristic element of the vehicle (V), with respect to the common reference system (XYZ), comprises determining data defining the position and orientation of said vehicle (V) with respect to said common reference system (XYZ).

In a 52nd aspect, according to any one of the preceding aspects from the 32nd to the 51st, said step of determining data representative of the position and orientation of said at least one characteristic element of the vehicle (V), with respect to the common reference system (XYZ), comprises determining with respect to said common reference system (XYZ) measured values assumed by a set of positional parameters chosen among:

- position and orientation of each front wheel of the vehicle (V),
- position and orientation of each rear wheel of said vehicle (V),
- position and orientation of a vehicle front axle (V),
- position and orientation of a vehicle rear axle (V),
- position and orientation of the longitudinal centerline of said vehicle (V),
- position and orientation of the thrust axis of said vehicle (V),
- position of a predetermined element of the vehicle (V) or fixed to the vehicle (V),
- position and orientation of each front wheel of the vehicle (V) and position and orientation of each rear wheel of said vehicle (V),
- position and orientation of a vehicle front axle (V) and position and orientation of a vehicle rear axle (V),
- position and orientation of the longitudinal centerline of said vehicle (V), and position and orientation of the thrust axis of said vehicle (V),
- position and orientation of each front wheel of the vehicle (V), position and orientation of each rear wheel of said vehicle (V), position and orientation of a vehicle front axle (V), position and orientation of a vehicle rear axle (V), and
- position and orientation of each front wheel of the vehicle (V), position and orientation of each rear wheel of said vehicle (V), position and orientation of a vehicle front axle (V), position and orientation of a vehicle rear axle (V), position and orientation of the longitudinal centerline of said vehicle (V), position and orientation of the thrust axis of said vehicle (V).

In a 53rd aspect, according to the preceding aspect, the electronic processor (201) is configured for:

- determining a reference system fixed to the vehicle (V) having at least two reference axes lying on a vertical plane through the longitudinal centerline of the vehicle (V) and a third axis perpendicular to said vertical plane, and
- re-calculating said set of positional parameters with respect to the reference system fixed to the vehicle (V).

In a 54th aspect, according to the preceding aspect, the electronic processor (201) is configured for performing an alignment procedure that provides for:

- comparing measured values of the set of positional parameters determined with respect to the reference system fixed to the vehicle (V) with a corresponding set of reference values or ranges,
- determining possible discrepancies between one or more measured values and respective one or more reference values or ranges, and
- in case there are discrepancies between one or more measured values and respective one or more reference values or ranges, commanding the execution or performing a correction procedure that brings the one or more measured values of the set of positional parameters determined with respect to the reference system fixed to the vehicle (V) to meet the respective optimal values or ranges.

In a 55th aspect, according to any one of the preceding aspects from the 32nd to the 54th, each image detector comprises two or more cameras mounted in a known and fixed relative position on a same rigid support, so that the distance between the two or more cameras and relative orientation of the optical axes of the two or more cameras of the same image detector are predetermined and known, wherein the two or more cameras of a same image detector are configured for cooperating with each other capturing images of the same respective portion of side of the vehicle (V) and defining a multi-ocular stereo vision system, and wherein at least one of the two cameras of a same image detector is configured for framing both the respective portion of the side of the vehicle (V) and the respective reference target (10).

In a 56th aspect, according to the preceding aspect, at least one of the two cameras of a same image detector is configured for framing both the respective side of the vehicle (V) and the respective reference target (10) and wherein the electronic processor (201) is configured for commanding said at least one of the two cameras to simultaneously capture both an image of the respective reference target (10) and the respective portion of the side of the vehicle (V).

In a 57th aspect, according to any one of the preceding aspects from the 32nd to the 56th, in combination with the 47th, each reference target (10) is a target of planar shape having an exposed surface provided with a plurality of prefixed graphic elements, optionally arranged in a checkerboard pattern, each of the prefixed graphic elements having known position and orientation on said exposed surface.

In a 58th aspect, according to the preceding aspect, including for each image detector: a plate shaped element, fixed or fixable on a base surface (102) in a position adjacent to one side of the vehicle (V), having an upper surface where it is arranged the respective reference target (10), a column superiorly coupled to the plate shaped element and emerging, optionally in the vertical direction, from the plate shaped element, and

- wherein said image detector is stably coupled to said column and is configured so as to capture the image of the reference target (10) present on the underlying plate shape element;
- optionally wherein the column is removably coupled to the plate shaped element.

In a $58th_{bis}$ aspect, according to the 55th and the 58th aspect, the column defines the rigid support to which the two or more cameras of a same image detector are fixed, said cameras being placed in spaced apart positions, optionally vertically, from each other.

In a 59th aspect, according to any one of the preceding aspects from the 32nd to the $58^{th}{}_{,bis}$ the apparatus includes two or more location targets (3) spaced apart from each other and positioned or in front of or behind the vehicle (V) between the control area (103) and the calibration device (2), and wherein determining data representative of the position and orientation, in said common reference system (XYZ), of at least one location target (3) comprises determining data representative of the position and orientation, in said common reference system (XYZ), of each of said location targets (3).

In a 60th aspect, according to any one of the preceding aspects from the 32nd to the 59th, the apparatus includes one or more dedicated image detectors (15), placed in known position and orientation in the common reference system (XYZ), wherein said electronic processor (201) is configured for determining the data representative of the position and orientation, in said common reference system (XYZ), of each location target (3) performing a procedure which comprises:

- observing each of said one or more location targets (3) with one or more dedicated image detectors (15),
- detecting, with said one or more dedicated image detectors (15), one or more respective images of each location target (3), and
- determining, based on the position and orientation in the common reference system (XYZ) of said one or more dedicated image detectors (15) and the one or more respective images detected by them of each location target (3), said data representative of the position and orientation in said common reference system (XYZ) of each of the location targets (3);

optionally, wherein said one or more dedicated image detectors (15) are positioned in an elevated area with respect to the control area (103) and to the base surface (102) and/or are configured for framing in its field of view each of the location targets (3);

or wherein:

said electronic processor (201) is configured for determining the data representative of the position and orientation, in said common reference system (XYZ), of each location target (3) performing a procedure that comprises:

- positioning one or more known common targets (16) at a known position and orientation with respect to the common reference system (XYZ), said one or more known common targets (16) being viewable by image detectors (11),
- detecting with said one or more image detectors (11) respective images of the one or more known common targets (16),
- determining, based on the images detected by the image detectors (11) of the one or more common targets (16), the data representative of the position and orientation in the common reference system (XYZ) of said one or more image detectors (11), and
- deriving then the data representative of the position and orientation of each location target (3) in the common reference system (XYZ) based on one or more images of said location target (3) detected by the one or more image detectors (11);

optionally, wherein said one or more common targets (16) are positioned in an elevated area with respect to the top of the vehicle (V) and/or in a position capable of being framed in the field of view of each of the image detectors (11).

In a 61st aspect, according to any one of the preceding aspects from the 32nd to the 60th, the electronic processor (201) is configured for performing one-off (or at least once), upon receipt of a specific command, said step of determining data representative of the position and orientation, in said common reference system (XYZ), of said at least one location target (3).

In a 62nd aspect, according to any one of the preceding aspects from the 32nd to the 61st, in combination with the $50th_{bis}$ aspect, the electronic processor (201) is configured for performing one-off (or at least once), upon receipt of a specific command, the initial procedure of determining data representative of the position and orientation, in said common reference system (XYZ), of the one or more reference targets (10) placed lateral to each longitudinal side of the control area (103).

In a 63rd aspect, according to any one of the preceding aspects from the 32nd to the 62nd, the computerized system (200) comprises at least one memory communicatively connected with said at least one electronic processor (201), said memory unit storing:

- data representative of the position and orientation of the vehicle (V), with respect to the common reference system (XYZ),
- data representative of the position and orientation, in said common reference system (XYZ), of said at least one location target (3), wherein receiving said data representative of the position and orientation of the vehicle (V) with respect to the common reference system (XYZ) provides for transferring from said memory to said at least one processor such data representative of the position and orientation of the vehicle (V) with respect to the common reference system (XYZ), wherein receiving said data representative of the position and orientation, in said common reference system (XYZ), of said at least one location target (3), provides for transferring from said memory to said at least one processor such data representative of the position and orientation of said at least one location target (3) in said common reference system (XYZ).

In a 64th aspect, according to any one of the preceding aspects from the 32nd to the 63rd, the computerized system (200) is configured for performing the method according to any one of the preceding aspects of method from the 1st to the 31st.

In the following, aspects are shown relative to a correction procedure that may be performed by the electronic processor (201) and used in the method according to any one of the preceding aspects from the 1st to the 31st or by the apparatus according to any one of the preceding aspects from the 32nd to the 64th. Once the correction procedure below described has been performed, according to a further aspect, the processing unit (201) may also be configured for communicating with a control unit of the vehicle (V) and for signaling to the latter the reached position and orientation useful for the calibration of the sensors of the vehicle itself.

In a 65th aspect, according to any one of the aspects from the 1st to the 31st, the method comprises verifying whether the current position and orientation of the calibration device (2) are correct or not.

In a 66th aspect, according to the preceding aspect, the step of verifying whether the current position and orientation of the calibration device (2) are correct or not comprises:

- comparing the measured values of said one or more location parameters (determinable by the data representative of the current position and orientation of the calibration device (2) in said common reference system (XYZ)) with respective reference values or ranges.

In a 67th aspect, according to the preceding aspect, the method provides also for:

- commanding a correction procedure that brings the one or more measured values to meet the respective reference values or ranges if there is a discrepancy between one or more measured values of said one or more location parameters and the respective reference values or ranges.

In a 68th aspect, according to the 66th or 67th aspect, the method provides also for:

- generating one or more respective error signals if there is a discrepancy between one or more measured values of said one or more location parameters and the respective reference values or ranges.

In a 69th aspect, according to the preceding aspect, the method provides also for:

- generating for each of said one or more error signals a respective optical signal on a screen of a user interface connected to the electronic processor (201), each optical signal having at least one property related to the respective error signal.

In a 70th aspect, according to any one of the aspects from the 1st to the 31st and from the 65th to the 69th, the support frame (4) carries one or more calibration elements, optionally comprising a/the calibration panel (7) and/or a/the reflective panel (8), wherein each calibration element is pivotally constrained with respect to the support frame itself about one or more axes of rotation (identified in the figures by the curved arrows R1, R2, R3 showing the rotation about each respective axis). For example, the one or more calibration elements (7, 8) may rotate according to a vertical yaw axis, according to a horizontal pitch axis and according to a horizontal roll axis. In another example the one or more calibration elements (7, 8) may rotate according to a vertical yaw axis and according to a horizontal pitch or roll axis. In another example, the one or more calibration elements (7, 8) may rotate according to one of said vertical yaw axis, a horizontal pitch axis and a horizontal roll axis.

In a 71st aspect, according to any one of the aspects from the 1st to the 31st and from the 65th to the 70th, the support frame (4) carries one or more calibration elements, optionally comprising a/the calibration panel (7) and/or a/the reflective panel (8), wherein each calibration element is translationally constrained along one or more axes of translation (T1, T2 or T3). For example, the one or more calibration elements (7, 8) may translate according to only one among T1, T2 or T3, or according to T1 and T2, or according to T2 and T3 or according to T1 and T3 or according to T1, T2 and T3.

In a 72nd aspect, according to the 70th or the 71st aspect, an angular movement about the one or more axes of rotation is given by one or more first automatic positioners controlled by the electronic processor (201).

In a 73rd aspect, according to the 71st, the 72nd, or the 73rd aspect, a translational movement according to the one or more axes of translation (T1, T2 and T3) is given by one or more second automatic positioners controlled by the electronic processor (201).

In a 74th aspect, according to any one of the aspects from the 1st to the 31st and from the 65th to the 73rd, the support frame (4) is carried by or comprises a carriage (50) having one or more locomotion elements, optionally comprising one or more wheels and/or tracks, and at least one motor connected to the one or more locomotion elements, wherein the electronic processor (201) is configured for controlling the one or more locomotion elements and/or the at least one motor and moving the carriage (50) and thus said calibration device (2) with respect to the vehicle (V) present in the control area (103).

In a 75th aspect, according to any one of the aspects from the 1st to the 31st and from the 65th to the 74th, when combined with the 67th aspect, the correction procedure performed by the electronic processor (201) comprises:

- commanding the angular movement of each calibration element about the one or more axes of rotation (see curved arrows R1, R2 and R3), by acting on said one or more first automatic positioners, and/or the translational movement along the one or more axes of translation (T1, T2 and T3) by acting on said one or more second automatic positioners.

In a 76th aspect, according to any one of the aspects from the 1st to the 31st and from the 65th to the 75th, when combined with the 67th aspect, the correction procedure performed by the electronic processor (201) comprises:

commanding the carriage (50) in order to position the calibration device in front of or behind the vehicle (V).

In a 76th$_{bis}$ aspect, according to any one of the two preceding aspects, the correction procedure is configured so that as a result of the angular movement and/or the translational movement and/or the positioning performed by the carriage there are no longer discrepancies between one or more measured values of the location parameters and the respective reference values or ranges.

In a 76th$_{ter}$ aspect, according to any one of the three preceding aspects, the correction procedure is configured so that as a result of the angular movement and/or the translational movement and the positioning performed by the carriage there are no longer discrepancies between one or more measured values of the location parameters and the respective reference values or ranges.

In a 76th$_{quater}$ aspect, according to any one of the four preceding aspects, the correction procedure is configured so that as a result of the angular movement and the translational movement and the positioning performed by the carriage there are no longer discrepancies between one or more measured values of the location parameters and the respective reference values or ranges.

In a 77th aspect, according to any one of the aspects from the 1st to the 31st and from the 65th to the 76th$_{quater}$, when combined with the 67th aspect, the correction procedure performed by the electronic processor (201) comprises:

commanding the carriage (50) performing a first positioning and orientation, for example of a rough type, of the calibration device with respect to the vehicle (V) (that for example leaves discrepancies between one or more measured values of the location parameters and the respective reference values or ranges), once the first positioning and orientation has been performed, commanding one or more of the first positioners and/or one or more of the second positioners in order to perform a second precision positioning and orientation of the calibration device or of each of the calibration members carried by the latter (so that there are no longer discrepancies between one or more measured values of the location parameters and the respective reference values or ranges).

In a 78th aspect, according to any one of the aspects from the 1st to the 31st and from the 65th to the 77th, when combined with the 67th aspect, the correction procedure performed by the electronic processor (201) comprises:

commanding the carriage (50) performing a/the first positioning and orientation of the calibration device with respect to the vehicle (V) that brings the one or more measured values of the one or more reference parameters to meet a first set of reference ranges including relatively wide ranges of acceptability for each of the location parameters;

commanding the first and/or second positioners performing a/the second positioning and orientation of the calibration device with respect to the vehicle (V) that brings the one or more measured values of the one or more reference parameters to meet a second set of reference ranges, wherein said second set of reference ranges comprises ranges of acceptability for each of the location parameters narrower with respect to the corresponding first reference ranges of the first set of reference ranges for each of the location parameters.

In a 79th aspect, according to any one of the aspects from the 32nd to the 64th, the electronic processor (201) is configured for verifying whether the current position and orientation of the calibration device (2) are correct or not.

In an 80th aspect, according to the preceding aspect, the step of verifying whether the current position and orientation of the calibration device (2) are correct or not comprises:

comparing the measured values of said one or more location parameters (determinable by the data representative of the current position and orientation of the calibration device (2) in said common reference system (XYZ)) with respective reference values or ranges.

In an 81st aspect, according to the preceding aspect, the electronic processor (201) is configured also for:

commanding a correction procedure that brings the one or more measured values to meet the respective reference values or ranges if there is a discrepancy between one or more measured values of said one or more location parameters and respective reference values or ranges.

In an 82nd aspect, according to the 80th or 81st aspect, the electronic processor (201) is configured also for:

generating one or more respective error signals if there is a discrepancy between one or more measured values of said one or more location parameters and the respective reference values or ranges.

In an 83rd aspect, according to the preceding aspect, the electronic processor (201) is configured also for:

generating for each of said one or more error signals a respective optical signal on a screen of a user interface connected to the electronic processor (201), each optical signal having at least one property related to the respective error signal.

In an 84th aspect, according to any one of the aspects from the 32nd to the 64th and from the 79th to the 83rd, the support frame (4) carries one or more calibration elements, optionally comprising a/the calibration panel (7) and/or a/the reflective panel (8), wherein each calibration element is pivotally constrained with respect to the support frame itself about one or more axes of rotation (see curved arrows R1, R2 and R3).

In an 85th aspect, according to any one of the aspects from the 32nd to the 64th and from the 79th to the 84th, the support frame (4) carries one or more calibration elements, optionally comprising a/the calibration panel (7) and/or a/the reflective panel (8), wherein each calibration element is translationally constrained along one or more axes of translation (T1, T2 or T3).

In an 86th aspect, according to the 84th or the 85th aspect, an angular movement about the one or more axes of rotation is given by first automatic positioners controlled by the electronic processor (201).

In an 87th aspect, according to the 84th, the 85th, or the 86th aspect, a translational movement according to the one or more axes of translation (T1, T2, T3) is given by second automatic positioners controlled by the electronic processor (201).

In an 88th aspect, according to any one of the aspects from the 32nd to the 64th and from the 79th to the 87th, the support frame (4) is carried by or comprises a carriage (50) having one or more locomotion elements, optionally comprising one or more wheels and/or tracks, and at least one motor connected to the one or more locomotion elements, wherein the electronic processor (201) is configured for controlling the one or more locomotion elements and/or the at least one motor and moving the carriage (50) and thus said calibration device (2) with respect to the vehicle (V) present in the control area (103).

In an 89th aspect, according to any one of the aspects from the 32nd to the 64th and from the 79th to the 88th, when combined with the 81st aspect, the correction procedure performed by the electronic processor (201) comprises:

commanding the angular movement of each calibration element about the one or more axes of rotation (identified in the figures by the curved arrows R1, R2 and R3 showing the rotation about each respective axis), by acting on one or more first automatic positioners, and/or the translational movement along the one or more axes of translation (T1, T2 and T3) by acting on one or more second automatic positioners.

In a 90th aspect, according to any one of the aspects from the 32nd to the 64th and from the 79th to the 89th, when combined with the 81st aspect, the correction procedure performed by the electronic processor (201) comprises:

commanding the carriage (50) in order to position the calibration device in front of or behind the vehicle (V).

In a 91st aspect, according to any one of the aspects from the 32nd to the 64th and from the 79th to the 90th, when combined with the 81st aspect, wherein the correction procedure is configured so that as a result of the angular movement and/or the translational movement and/or the positioning performed by the carriage there are no longer discrepancies between one or more measured values of the location parameters and the respective reference values or ranges.

In a 92nd aspect, according to any one of the aspects from the 32nd to the 64th and from the 79th to the 91st, when combined with the 81st aspect, wherein the correction procedure is configured so that as a result of the angular movement and/or the translational movement and the positioning performed by the carriage there are no longer discrepancies between one or more measured values of the location parameters and the respective reference values or ranges.

In a 93rd aspect, according to any one of the aspects from the 32nd to the 64th and from the 79th to the 92nd, when combined with the 81st aspect, wherein the correction procedure is configured so that as a result of the angular movement and the translational movement and the positioning performed by the carriage there are no longer discrepancies between one or more measured values of the location parameters and the respective reference values or ranges.

In a 94th aspect, according to any one of the aspects from the 32nd to the 64th and from the 79th to the 93th, when combined with the 81st aspect, the correction procedure performed by the electronic processor (201) comprises:

commanding the carriage (50) performing a first positioning and orientation, for example of a rough type, of the calibration device with respect to the vehicle (V) (that for example leaves discrepancies between one or more measured values of the location parameters and the respective reference values or ranges), and once the first positioning and orientation has been performed, commanding one or more of the first positioners and/or one or more of the second positioners in order to perform a second precision positioning and orientation of the calibration device or of each of the calibration members carried by the latter (so that there are no longer discrepancies between one or more measured values of the location parameters and the respective reference values or ranges).

In a 95th aspect, according to any one of the aspects from the 32nd to the 64th and from the 79th to the 94th, when combined with the 81st aspect, the correction procedure performed by the electronic processor (201) comprises:

commanding the carriage (50) performing a/the first positioning and orientation of the calibration device with respect to the vehicle (V) that brings the one or more measured values of the one or more reference parameters to meet a first set of reference ranges including relatively wide ranges of acceptability for each of the location parameters, and commanding the first and/or second positioners performing a/the second positioning and orientation of the calibration device with respect to the vehicle (V) that brings the one or more measured values of the one or more reference parameters to meet a second set of reference ranges, wherein said second set of reference ranges comprises ranges of acceptability for each of the location parameters narrower with respect to the corresponding first reference ranges of the first set of reference ranges for each of the location parameters.

In a 96th aspect, it is provided an electronic processor (201) programmed for performing the method according to any one of the preceding aspects of method from the 1st to the 31st or from the 65th to the 78th.

In a 97th aspect, it is provided an electronic processor (201) including at least one control unit and at least one memory communicatively connected with the least one control unit, said at least one memory containing instructions that when executed by the control unit configure the electronic processor (201) to perform the method according to any one of the preceding aspects from the 1st to the 31st or from the 65th to the 78th.

In a 98th aspect, it is provided one memory for an electronic processor (201) containing instructions that when executed by the control unit of the electronic processor (201) configure the electronic processor (201) itself to perform the method according to any one of the preceding aspects from the 1st to the 31st or from the 65th to the 78th.

In a 99th aspect, it is provided a test bay including at least one test lane and at least one calibration apparatus for an advanced driver assistance system (ADAS) of a vehicle (V), said calibration apparatus being according to any one of the preceding aspects from the 32nd to the 64th or from the 79th to the 95th.

In a 100th aspect, according to the preceding aspect the test lane comprises a base surface (102) or floor upon which lays the calibration apparatus and a control area (103) intended to receive a vehicle (V), said control area (103) being located in a central zone of the test lane and being defined by:

a portion of the base surface (102) or floor, or one or more bearing surfaces of a lifter forming part of said test bay.

A 101st aspect concerns a method of positioning of a calibration device (2) for one or more vehicular sensors, for example for one or more vehicular sensors of an advanced driver assistance system (ADAS) of a vehicle (V), wherein the vehicle (V) is positioned in a respective control area (103) and wherein the calibration device (2) is positionable in front of or behind with respect to the vehicle (V), said method being implemented by a computerized system (200) including at least one electronic processor (201) and configured for:

determining or knowing data representative of the position and orientation of the calibration device (2) with respect to the vehicle (V), verifying whether the current position and orientation of the calibration device (2) with respect to the vehicle (V) are correct or not based on:

said data representative of the current position and orientation of the calibration device (2) with respect to the vehicle (V), and reference values or ranges establishing a correct position and orientation of the calibration device (2) with respect to the vehicle (V).

In a 102nd aspect, according to the preceding aspect, wherein if as a result of said step of verifying whether the current position and orientation of the calibration device (2) are correct or not it is determined that the current position and/or the orientation of the calibration device (2) are not correct, the method also includes:

commanding a correction procedure that brings the current position and orientation of the calibration device (2) to be correct, optionally generating one or more respective error signals, each of said one or more error signals including a respective optical signal on a screen of a user interface connected to the electronic processor (201), each optical signal having at least one property related to the respective error signal.

In a 103rd aspect, according to the 101st or 102nd aspect the step of verifying whether the current position and orientation of the calibration device (2) with respect to the vehicle (V) are correct or not comprises:

comparing the measured values of one or more relative location parameters of the calibration device (2) determinable by the data representative of the current position and orientation of the calibration device (2) with respect to the vehicle with respective reference values or ranges.

In a 104th aspect, according to the preceding aspect, the method provides also for:

commanding a/the correction procedure that brings the one or more measured values to meet the respective reference values or ranges if there is a discrepancy between one or more measured values of said one or more relative location parameters and the respective reference values or ranges.

In a 105th aspect, according to the 104th or 105th aspect, the method provides also for:

generating one or more respective error signals if there is a discrepancy between one or more measured values of said one or more relative location parameters and the respective reference values or ranges.

In a 106th aspect, according to the preceding aspect, the method provides also for:

generating for each of said one or more error signals a respective optical signal on a screen of a user interface connected to the electronic processor (201), each optical signal having at least one property related to the respective error signal.

In a 107th aspect, according to any one of the aspects from the 101st to the 106th, the calibration device (2) comprises a support frame (4) that carries one or more calibration elements, optionally comprising a/the calibration panel (7) and/or a/the reflective panel (8), wherein each calibration element is pivotally constrained with respect to the support frame itself about one or more axes of rotation (identified in the figures by the curved arrows R1, R2 and R3 showing the rotation about each respective axis).

In a 108th aspect, according to any one of the aspects from the 101st to the 107th, the calibration device (2) comprises a/the support frame (4) that carries one or more calibration elements, optionally comprising a/the calibration panel (7) and/or a/the reflective panel (8), wherein each calibration element is translationally constrained along one or more axes of translation (T1, T2 or T3).

In a 109th aspect, according to the 107th or the 108th aspect, an angular movement about the one or more axes of rotation is given by one or more first automatic positioners controlled by the electronic processor (201).

In a 110th aspect, according to the 107th or the 108th or the 109th aspect, a translational movement according to the one or more axes of translation (T1, T2, T3) is given by one or more second automatic positioners controlled by the electronic processor (201).

In a 111th aspect, according to any one of the aspects from the 101st to the 110th, the calibration device (2) comprises a/the support frame (4) that is carried by or comprises a carriage (50) having one or more locomotion elements, optionally comprising one or more wheels and/or tracks, and at least one motor connected to the one or more locomotion elements, wherein the electronic processor (201) is configured for controlling the one or more locomotion elements and/or the at least one motor and moving the carriage (50) and thus said calibration device (2) with respect to the vehicle (V) present in the control area (103).

In a 112th aspect, according to any one of the aspects from the 109th to the 111th, when combined with the 102nd or 104th aspect, the correction procedure performed by the electronic processor (201) comprises:

commanding the angular movement of each calibration element about the one or more axes of rotation (identified in the figures by the curved arrows R1, R2, R3 showing the rotation about each respective axis), by acting on said one or more first automatic positioners, and/or the translational movement along the one or more axes of translation (T1, T2 and T3) by acting on said one or more second automatic positioners.

In a 113th aspect, according to any one of the aspects from the 110th to the 111th, when combined with the 102nd or 104th aspect, the correction procedure performed by the electronic processor (201) comprises:

commanding the carriage (50) in order to position the calibration device in front of or behind the vehicle (V).

In a 114th aspect, according to any one of the two preceding aspects, the correction procedure is configured so that, as a result of the angular movement and/or the translational movement and/or the positioning performed by the carriage, there are no longer discrepancies between one or more measured values of the relative location parameters and the respective reference values or ranges; or the correction procedure is configured so that, as a result of the angular and/or the translational movement and/or the positioning performed by the carriage, the current position and orientation of the calibration device (2) become correct.

In a 115th aspect, according to any one of the three preceding aspects, the correction procedure is configured so that, as a result of the angular movement and/or the translational movement and the positioning performed by the carriage, there are no longer discrepancies between one or more measured values of the relative location parameters and the respective reference values or ranges; or the correction procedure is configured so that as a result of the angular movement and/or the translational movement and the positioning performed by the carriage, the current position and orientation of the calibration device (2) become correct.

In a 116th aspect, according to any one of the four preceding aspects, the correction procedure is configured so that, as a result of the angular movement and the translational movement and the positioning performed by the carriage, there are no longer discrepancies between one or more measured values of the relative location parameters and the respective reference values or ranges; or the correction procedure is configured so that, as a result of the angular movement and the translational movement and the positioning performed by the carriage, the current position and orientation of the calibration device (2) become correct.

In a 117th aspect, according to any one of the aspects from the 111th to the 116th, when combined with the 102nd or 104th aspect, the correction procedure performed by the electronic processor (201) comprises:

- commanding the carriage (50) performing a first positioning and orientation, for example of a rough type, of the calibration device with respect to the vehicle (V) (that for example leaves discrepancies between one or more measured values of the relative location parameters and the respective reference values or ranges),
- once the first positioning and orientation has been performed, commanding one or more of the first positioners and/or one or more of the second positioners in order to perform a second precision positioning and orientation of the calibration device or of each of the calibration members carried by the latter (so that for example there are no longer discrepancies between one or more measured values of the relative location parameters and the respective reference values or ranges).

In a 118th aspect, according to any one of the aspects from the 111th to the 117th, when combined with the 102nd or 104th aspect, the correction procedure performed by the electronic processor (201) comprises:

- commanding the carriage (50) performing a/the first positioning and orientation of the calibration device with respect to the vehicle (V) that brings the one or more measured values of the one or more relative location parameters to meet a first set of reference ranges including relatively wide ranges of acceptability for each of the relative location parameters, (or that brings the current position and orientation of the calibration device (2) to be almost correct);
- commanding the first and/or the second positioners performing a/the second positioning and orientation of the calibration device with respect to the vehicle (V) that brings the one or more measured values of the one or more relative location parameters to meet a second set of reference ranges (or that brings the current position and orientation of the calibration device (2) to be correct); wherein said second set of reference range comprises ranges of acceptability for each of the relative location parameters narrower with respect to the corresponding reference ranges of the first set of reference ranges for each of the relative location parameters.

In a 119th aspect, according to any one of the aspects from the 101st to the 118th, when combined with the 102nd or 104th aspect, wherein the step of determining data representative of the position and orientation of the calibration device (2) with respect to the vehicle (V) may be carried out with any known methodology. For example, the device (2) and for example the support frame (4) of the device (2) itself may engage one or more targets (for example two- or three-dimensional targets provided with a plurality of reference elements of known position and geometry), while the vehicle may support one or more cameras that by observing the targets carried by the support frame may determine the relative position between the calibration device (2) and the vehicle (V). Alternatively it may be the support frame to carry one or more cameras configured for framing and seeing one or more targets (for example two- or three-dimensional targets provided with a plurality of reference elements of known position and geometry) carried by the vehicle: also in this case from the observation of targets known by the cameras, the electronic processor 201 that communicates and receives data from the cameras may trace back the relative position between calibration device and vehicle V present in the area 103.

In a 120th aspect, according to any one of the aspects from the 101st to the 119th, the relative location parameters comprise one or more of:

- position of the calibration device with respect to a rear axle of the vehicle (V),
- position of the calibration device with respect to a longitudinal centerline of said vehicle (V),
- position of the calibration device with respect to a thrust axis of said vehicle (V),
- position of the calibration device with respect to an element of the vehicle (V) or fixed to the vehicle (V),
- orientation of the calibration device with respect to a rear axle of the vehicle (V),
- orientation of the calibration device with respect to a longitudinal centerline of said vehicle (V)
- orientation of the calibration device with respect to a thrust axis of said vehicle (V),
- orientation of the calibration device with respect to an element of the vehicle (V) or fixed to the vehicle (V),
- position and orientation of the calibration device with respect to a rear axle of the vehicle (V),
- position and orientation of the calibration device with respect to a longitudinal centerline of said vehicle (V),
- position and orientation of the calibration device with respect to a thrust axis of said vehicle (V)
- position of the calibration device with respect to an element of the vehicle (V) or fixed to the vehicle (V),
- orientation of the calibration device with respect to an element of the vehicle (V) or fixed to the vehicle (V), and
- position and orientation of the calibration device with respect to an element of the vehicle (V) or fixed to the vehicle (V).

Any other parameters describing the relative position between the calibration device and the vehicle (V) may obviously be used.

A 121st aspect concerns a calibration apparatus for one or more vehicular sensors, for example for one or more vehicular sensors of an advanced driver assistance system (ADAS) of a vehicle (V), said calibration apparatus including:

- a calibration device (2) positionable in front of or behind with respect to a vehicle (V) present in a respective control area (103),
- a computerized system (200) including at least one electronic processor (201) and configured for:
  - determining or knowing data representative of the position and orientation of the calibration device (2) with respect to the vehicle (V),
  - verifying whether the current position and orientation of the calibration device (2) with respect to the vehicle (V) are correct or not based on:
    - said data representative of the current position and orientation of the calibration device (2) with respect to the vehicle (V), and
    - reference values or ranges establishing a correct position and orientation of the calibration device (2) with respect to the vehicle (V).

In a 122nd aspect, according to the preceding aspect, wherein if as a result of said step of verifying whether the current position and orientation of the calibration device (2) are correct or not the electronic processor (201) determines that the current position and/or the orientation of the calibration device (2) are not correct, the electronic processor (201) is configured also for:

commanding a correction procedure that brings the current position and orientation of the calibration device (2) to be correct, optionally generating one or more respective error signals, each of said one or more error signals including a respective optical signal on a screen of a user interface connected to the electronic processor (201), each optical signal having at least one property related to the respective error signal.

In a 123rd aspect, according to the 121st or 122nd aspect, the step of verifying whether the current position and orientation of the calibration device (2) with respect to the vehicle (V) are correct or not comprises:

comparing the measured values of one or more relative location parameters of the calibration device (2) determinable by the data representative of the current position and orientation of the calibration device (2) with respect to the vehicle with respective reference values or ranges.

In a 124th aspect, according to the preceding aspect, the electronic processor (201) is also configured for:

commanding a/the correction procedure that brings the one or more measured values to meet the respective reference values or ranges if there is a discrepancy between one or more measured values of said one or more relative location parameters and the respective reference values or ranges.

In a 125th aspect, according to the 124th or 123th aspect, the electronic processor (201) is also configured for:

generating one or more respective error signals if there is a discrepancy between one or more measured values of said one or more relative location parameters and the respective reference values or ranges.

In a 126th aspect, according to the preceding aspect, the electronic processor (201) is also configured for:

generating for each of said one or more error signals a respective optical signal on a screen of a user interface connected to the electronic processor (201), each optical signal having at least one property related to the respective error signal.

In a 127th aspect, according to any one of the aspects from the 121st to the 126th, the calibration device (2) comprises a support frame (4) that carries one or more calibration elements, optionally comprising a/the calibration panel (7) and/or a/the reflective panel (8), wherein each calibration element is pivotally constrained with respect to the support frame itself about one or more axes of rotation (identified in the figures by the curved arrows R1, R2, R3 showing the rotation about each respective axis). For example, the one or more calibration elements (7, 8) may rotate according to a vertical yaw axis, according to a horizontal pitch axis and according to a horizontal roll axis. In another example, the one or more calibration elements (7, 8) may rotate according to a vertical yaw axis and according to a horizontal pitch or roll axis. In another example, the one or more calibration elements (7, 8) may rotate according to one of said vertical yaw axis, a horizontal pitch axis and a horizontal roll axis.

In a 128th aspect, according to any one of the aspects from the 121st to the 127th, the calibration device (2) comprises a/the support frame (4) that carries one or more calibration elements, optionally comprising a/the calibration panel (7) and/or a/the reflective panel (8), wherein each calibration element is translationally constrained along one or more axes of translation (T1, T2 or T3). For example the one or more calibration elements (7, 8) may translate according to only one among T1, T2 or T3, or according to T1 and T2, or according to T2 and T3 or according to T1 and T3 or according to T1, T2 and T3.

In a 129th aspect, according to the 127th or the 128th, aspect an angular movement about the one or more axes of rotation is given by one or more first automatic positioners controlled by the electronic processor (201).

In a 130th aspect, according to the 127th, the 128th, or the 129th aspect, a translational movement according to the one or more axes of translation (T1, T2 and T3) is given by one or more second automatic positioners controlled by the electronic processor (201).

In a 131st aspect, according to any one of the aspects from the 121st to the 130th. the calibration device (2) comprises a/the support frame (4) that is carried by or comprises a carriage (50) having one or more locomotion elements, optionally comprising one or more wheels and/or tracks, and at least one motor connected to the one or more locomotion elements, wherein the electronic processor (201) is configured for controlling the one or more locomotion elements and/or the at least one motor and moving the carriage (50) and thus said calibration device (2) with respect to the vehicle (V) present in the control area (103).

In a 132nd aspect, according to any one of the aspects from the 129th to the 131st, when combined with the 122nd or 124th aspect, the correction procedure performed by the electronic processor (201) comprises:

commanding the angular movement of each calibration element about the one or more axes of rotation (identified in the figures by the curved arrows R1, R2 and R3 showing the rotation about each respective axis), by acting on said one or more first automatic positioners, and/or the translational movement along the one or more axes of translation (T1, T2 and T3) by acting on said one or more second automatic positioners.

In a 133rd aspect, according to any one of the aspects from the 130th to the 131st, when combined with the 122nd or 124th aspect, the correction procedure performed by the electronic processor (201) comprises:

commanding the carriage (50) in order to position the calibration device in front of or behind the vehicle (V).

In a 134th aspect, according to any one of the two preceding aspects, the correction procedure is configured so that, as a result of the angular movement and/or the translational movement and/or positioning performed by the carriage, there are no longer discrepancies between one or more measured values of the relative location parameters and the respective reference values or ranges; or the correction procedure is configured so that, as a result of the angular movement and/or the translational movement and/or the positioning performed by the carriage, the current position and orientation of the calibration device (2) become correct.

In a 135th aspect, according to any one of the three preceding aspects, the correction procedure is configured so that, as a result of the angular movement and/or the translational movement and the positioning performed by the carriage, there are no longer discrepancies between one or more measured values of the relative location parameters and the respective reference values or ranges; or the correction procedure is configured so that as a result of the angular movement and/or the translational movement and the positioning performed by the carriage, the current position and orientation of the calibration device (2) become correct.

In a 136th aspect, according to any one of the four preceding aspects, the correction procedure is configured so that, as a result of the angular movement and the translational movement and the positioning performed by the carriage, there are no longer discrepancies between one or more measured values of the relative location parameters and the respective reference values or ranges; or the correction procedure is configured so that, as a result of the angular movement and the translational movement and the positioning performed by the carriage, the current position and orientation of the calibration device (2) become correct.

In a 137th aspect, according to any one of the aspects from the 111th to the 116th, when combined with the 122nd or 124th aspect, the correction procedure performed by the electronic processor (201) comprises:

- commanding the carriage (50) performing a first positioning and orientation, for example of a rough type, of the calibration device with respect to the vehicle (V) (that for example leaves discrepancies between one or more measured values of the relative location parameters and the respective reference values or ranges), and
- once the first positioning and orientation has been performed, commanding one or more of the first positioners and/or one or more of the second positioners in order to perform a second precision positioning and orientation of the calibration device or of each of the calibration members carried by the latter (so that for example there are no longer discrepancies between one or more measured values of the relative location parameters and the respective reference values or ranges).

In a 138th aspect, according to any one of the aspects from the 131st to the 137th, when combined with the 122nd or 124th aspect, the correction procedure performed by the electronic processor (201) comprises:

- commanding the carriage (50) performing a/the first positioning and orientation of the calibration device with respect to the vehicle (V) that brings the one or more measured values of the one or more relative location parameters to meet a first set of reference ranges including relatively wide ranges of acceptability for each of the relative location parameters, (or that brings the current position and orientation of the calibration device (2) to be almost correct); and
- commanding the first and/or the second positioners performing a/the second positioning and orientation of the calibration device with respect to the vehicle (V) that brings the one or more measured values of the one or more relative location parameters to meet a second set of reference ranges (or that brings the current position and orientation of the calibration device (2) to be correct); wherein said second set of reference ranges comprises ranges of acceptability for each of the location parameters narrower with respect to the corresponding reference ranges of the first set of reference ranges for each of the relative location parameters.

In a 139th aspect, according to any one of the aspects from the 121st to the 138th, when combined with the 122nd or 124th aspect, wherein the step of determining data representative of the position and orientation of the calibration device (2) with respect to the vehicle (V) may be carried out with any known methodology. For example, the device (2) and for example the support frame (4) of the device (2) itself may engage one or more targets (for example two- or three-dimensional targets provided with a plurality of reference elements of known position and geometry), while the vehicle may support one or more cameras that by observing the targets carried by the support frame may determine the relative position between the calibration device (2) and the vehicle (V). Alternatively it may be the support frame to bring one or more cameras configured for framing and seeing one or more targets (for example two- or three-dimensional targets provided with a plurality of reference elements of known position and geometry) carried by the vehicle: also in this case from the observation of targets known by the cameras, the electronic processor (201) that communicates and receives data from the cameras may trace the relative position between calibration device and vehicle (V) present in the area (103).

In a 140th aspect, according to any one of the aspects from the 121st to the 139th, the relative location parameters comprise one or more of:

- position of the calibration device with respect to a rear axle of the vehicle (V),
- position of the calibration device with respect to a longitudinal centerline of said vehicle (V),
- position of the calibration device with respect to a thrust axis of said vehicle (V),
- position of the calibration device with respect to an element of the vehicle (V) or fixed to the vehicle (V),
- orientation of the calibration device with respect to a rear axle of the vehicle (V),
- orientation of the calibration device with respect to a longitudinal centerline of said vehicle (V),
- orientation of the calibration device with respect to a thrust axis of said vehicle (V), orientation of the calibration device with respect to an element of the vehicle (V) or fixed to the vehicle (V),
- position and orientation of the calibration device with respect to a rear axle of the vehicle (V),
- position and orientation of the calibration device with respect to a longitudinal centerline of said vehicle (V),
- position and orientation of the calibration device with respect to a thrust axis of said vehicle (V),
- position of the calibration device with respect to an element of the vehicle (V) or fixed to the vehicle (V),
- orientation of the calibration device with respect to an element of the vehicle (V) or fixed to the vehicle (V), and
- position and orientation of the calibration device with respect to an element of the vehicle (V) or fixed to the vehicle (V).

Any other parameters describing the relative position between the calibration device and the vehicle (V) may obviously be used.

BRIEF DESCRIPTION OF FIGURES

Some embodiments and aspects of the invention will be described herein with reference to the attached figures, which are provided for illustrative purposes only and are therefore not limiting wherein.

DEFINITIONS AND CONVENTIONS

Figure 1:
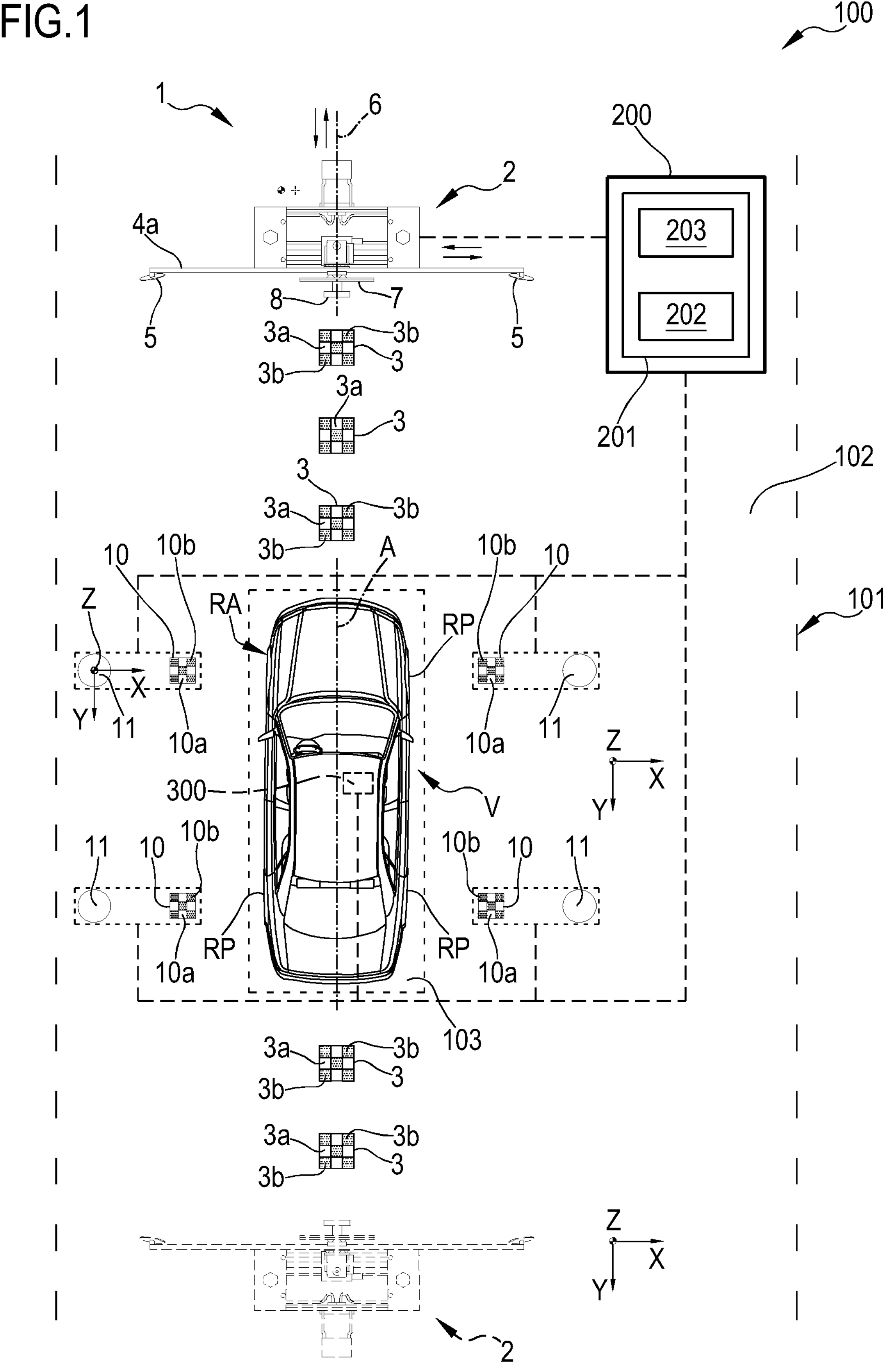
FIG. 1 is a schematic plan view of a first embodiment of a vehicle test bay using a calibration apparatus for one or more vehicular sensors, according to aspects of the invention.

It is noted that in the present detailed description, corresponding parts shown in the various figures are indicated with the same numerical references. Figures may show the object of the invention by means of non-scaled representations; therefore, parts and components shown in the figures relative to the object of the invention may relate exclusively to schematic representations.

In the description and claims, the following terms have the respective meanings indicated below.

Vehicle

The term vehicle comprises motor vehicles, vans, trucks, lorries, buses, pick-ups and in general any vehicle intended for the transport of goods and/or persons.

Computerized System and Electronic Processor

The computerized system 200 described and claimed herein comprises at least one electronic processor 201 in charge of processing data received from various devices and/or sensors and performing the steps described and claimed herein. The electronic processor comprises 201 at least one control unit 202 and at least one memory 203 communicatively connected with the control unit(s). Each control unit 202 may be a single unit or be formed by a plurality of distinct control units depending on design choices and operational requirements.

With the term control unit, it is intended an electronic type component which may comprise at least one among: a digital processor (CPU), an analogue type circuit, or a combination of one or more digital processors with one or more analogue type circuits. The control unit and thus the electronic processor may be "configured" or "programmed" to perform certain steps: this may be realized in practice with any means that allow to configure or program the control unit. For example, in case of a control unit including one or more CPUs and one or more memories, one or more programs may be stored in appropriate memory banks attached to the CPU or CPUs; the program or programs contain instructions which, when executed by the CPU or CPUs, program or configure the control unit to perform the operations described in relation to the control unit. Alternatively, if the control unit is or comprises analogue type circuitry, the circuit of the control unit may be designed to include circuitry configured, in use, for processing electrical signals so as to perform the steps relative to the control unit.

DETAILED DESCRIPTION

With reference to the attached figures, a test bay for vehicles, for example for passenger cars, which may be present in specialized workshops for the control and testing of vehicles and safety and/or assisted driving systems in vehicles, has been indicated overall with 100.

The test bay 100 comprises at least one test lane 101 and at least one calibration apparatus 1 for example intended to calibrate vehicular sensors of an advanced driver assistance system (ADAS) of a vehicle V that accesses the test lane 101. It should be noted that the calibration apparatus 1 may be used for the calibration of sensors of various types, such as for example radars, cameras and other sensors, such as LIDAR, ultrasound and infrared (IR) sensors, used in the ADAS for determining the distance, speed and/or angle (height or azimuth) of objects in an environment. On the other hand, one or more of the aforementioned sensors may require a periodic re-alignment or re-calibration, for example due to the effects of wear or misalignment due to driving conditions or a collision.

Figure 2:
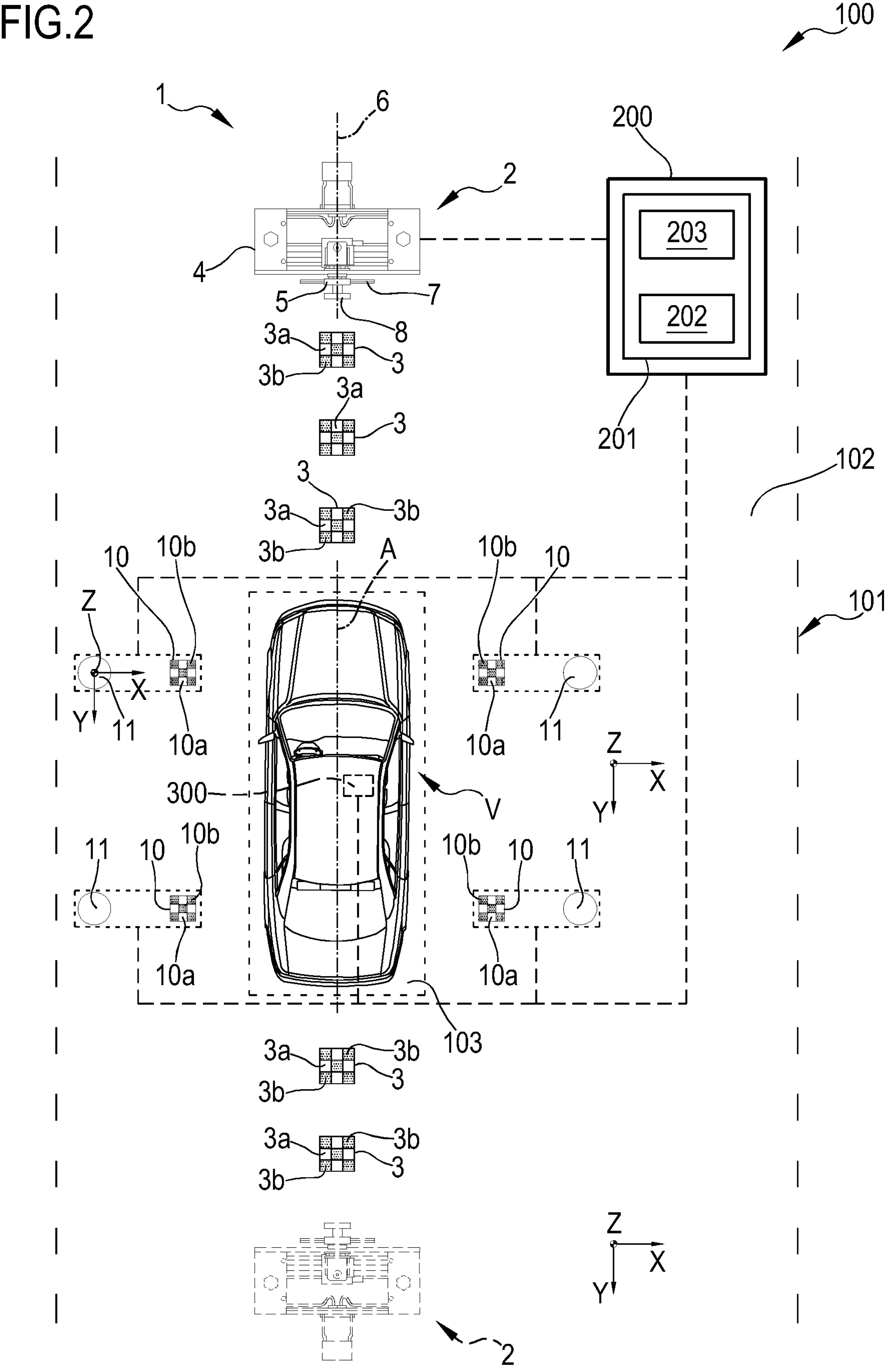
FIG. 2 is a schematic plan view of a second embodiment of a vehicle test bay using a calibration apparatus for one or more vehicular sensors, according to aspects of the invention.

The test lane 101 comprises a fixed base surface, or floor, 102 that defines the plane upon which lays the calibration apparatus 1 and a control area 103 intended for receiving the vehicle V. The control area 103 is located in a central zone of the test lane 101 and is for example defined, as shown in FIGS. 1 and 2, by a portion of the fixed base surface or floor 102: in other words, the control area 103 may be defined by a central part of the base surface or floor and then lie on the same plane and in continuity with the base surface or floor of the bay 100. In an alternative embodiment, the test bay 100 may comprise a lifter (not shown in FIGS. 1 and 2): in this case, the control area 103 may be defined by one or more bearing surfaces located above the lifter (for example defined by plates or bearing tracks for the wheels of the vehicle V) and the bearing plane of the vehicle may be co-planar or less with respect to the plane defined by the base surface or floor where the components of the apparatus 1 lay.

Having made these general premises relative to the test bay 100, below are first described the structural components of the calibration apparatus 1 operating in the test bay 100, and then the functioning, i.e. the method that the computerized system 200 forming part of the apparatus 1 is configured for performing.

The calibration apparatus 1 comprises a calibration device 2 positionable in front of or behind (depending on whether they respectively have to calibrate front or rear sensors of the vehicle) with respect to a vehicle V present in the control area 103 of the bay 100 where the sensors of the vehicle are subject to control and eventual calibration. Evidently, the calibration apparatus 1 may comprise two distinct calibration devices 2: one operating in front of the vehicle (as shown in FIGS. 1 and 2) and one operating behind the vehicle (schematically shown as a discontinuous line in FIGS. 1 and 2). Below, without losing in generality, only one calibration device 2 will be described, as any further device 2 would show a similar structure.

The apparatus 1 comprises, or at least is configured for cooperating with, one or more location targets 3. Each location target 3 is fixable in front of or behind the vehicle, between the control area and the calibration device 2. In the shown examples, each target location is fixed directly or indirectly (e.g. after the interposition of a connection support or layer) to the fixed base surface or floor 102 that, in the shown example, is part of the same fixed surface where also the control area 103 that receives the vehicle V under verification lies. Nothing, however, excludes, as already mentioned, that the fixed base surface or floor and the control area lie on separate surfaces, for example on separate plans.

It should be noted that it may be provided the use of more than one front location targets and more than one rear location targets. In the example shown in FIG. 1, the apparatus 1 cooperates with or comprises two location targets 3 positioned behind the vehicle V and the control area 103 and two or more (for example three) location targets 3 positioned in front of the vehicle V and the control area 103. In any case, the front location targets 3 are arranged on the fixed base surface or floor between the control area 103 and a front calibration device 2, while the rear location targets 3 are arranged on the fixed base surface or floor 102 between the control area 103 and the rear calibration device 2. As mentioned, the location target/s 3 are directly or indirectly fixed to the fixed base surface or floor: in case of more targets 3 they are for example arranged in front of and/or behind the control area, so as to result spaced apart and for example aligned with each other as shown in FIG. 2. However, there is nothing to prevent that the front and/or rear location targets 3 are not aligned; it is even possible that the targets 3 are neither aligned nor identically oriented, but misaligned and angularly rotated with each other, as for example shown in FIG. 2A. When the calibration device 2 is free from one or more transversal arms (as indeed in FIG. 2A) and is therefore very compact, it may be useful to have the location targets arranged between the control area 103 and the calibration device 2 itself in positions spaced apart in a transverse direction with respect to the longitudinal centerline A of the vehicle placed in the control area 103: in this way, should it be necessary, for example, to calibrate radar sensors placed in lateral areas of the front of the vehicle, it is possible to move the entire calibration device 2 to the right or left with respect to the longitudinal axis A of the vehicle V and to take advantage of the respective set of location targets 3 placed to the right or left of the axis A in front of the vehicle.

Going into further detail and with reference to the examples shown in the attached figures, each of the location target 3 has a planar conformation: for example, each target may be constituted by a thin flat plate or a planar film (and thus show a thickness for example in the range of 1-20 mm and in any case much less with respect to the two other dimensions of the target itself) fixed to the fixed base surface or floor 102 using known connection means: for example, each target 3 may be fixed with threaded couplings, with rivets or with an adhesive layer or still with other systems to the fixed base surface or floor 102. Each location target 3 has an exposed surface 3*a*, i.e. in the examples shown, the top surface, provided with a plurality of prefixed graphic elements known 3*b*, positioned and oriented in a known manner (i.e. known from the computerized system 200 of the apparatus 1): for example, the known graphical elements 3*b* may be arranged in a checkerboard pattern on the exposed surface 3*a* of each positioning target. Although location targets 3 of planar and thin shape represent a currently preferred solution, since once fixed to the fixed base surface or floor they do not occupy (or occupy very little) volume in the vertical direction and may therefore easily receive in transit the vehicles that are being inspected, it is not excluded the possibility of using location targets 3 of different conformation, for example of the type with noticeable vertical encumbrance and therefore protruding from the surface 102.

As already mentioned, the calibration apparatus 1 includes one or more calibration devices 2 that, as it will be described below, are intended to cooperate with the location targets 3 in order to determine the correct positioning of each calibration device 2 with respect to the vehicle V positioned in the control area 103.

As for the structure of the calibration device, each calibration device 2 comprises a support frame 4 and at least one sensor 5 fixed to the calibration device 2: said sensor may be of various nature, but in the shown examples comprises one or more optical sensors fixed to the calibration device and for example constrained to the support frame 4: each optical sensor 5 is arranged and oriented on the support frame so that the field of view of the optical sensor itself frames at least one location target 3: for example, in case of FIG. 1, each optical sensor 5 of the front calibration device 2 is configured so as to frame in its field of view at least one, for example two, and optionally all of the front location targets 3 to the vehicle. Analogously, in case of a calibration device 1 placed behind the vehicle each optical sensor 5 of the rear calibration device 2 is configured so as to frame in its field of view at least two and optionally all of the rear location targets to the vehicle V.

In the shown examples, said one or more optical sensors are positioned symmetrically with respect to a vertical centerline plane 6 of the support frame 4: in the solution of FIG. 1 the optical sensors 5 are placed at the ends of a horizontal bar 4*a* of the support frame 4, while in FIG. 2 the optical sensor or the optical sensors 5 is/are positioned centrally, in correspondence of or in proximity of the vertical centerline plane 6 of the support frame 4 of the calibration device 2. Although in the currently preferred solution the one or more optical sensors 5 is/are arranged in position symmetrical with respect to a vertical centerline plane of the calibration device 2, and for example of the support frame, this circumstance is preferential and non-mandatory.

As mentioned, the calibration apparatus 1 may be used for the calibration of sensors of various types on the vehicle under test and, for this purpose, the support frame 4 carries also one or more calibration elements that, once appropriately positioned with respect to the vehicle V present in the control area 103, allow precisely the calibration of sensors on-board of the vehicle itself. For example, with reference to the shown examples, the advanced guidance system of the vehicle V present in the control area may comprise at least one ADAS camera: in order to allow the calibration of the ADAS camera, the calibration device 2 may comprise as calibration element a calibration panel 7 (see FIGS. 1, 2 and 3) intended to be used to calibrate the ADAS camera of the vehicle. The calibration element (in this case, the calibration panel) may be mounted in a swiveling and/or movable manner on the support frame 4: for example the element or calibration panel 7 may be mounted on the support frame so as to be swiveling about one, two or three axes of rotation orthogonal to each other and so as to be translatable according to one, two or three axes of translation orthogonal to each other; in the shown case in FIGS. 1,2 and 3, the calibration panel 7 is for example a graphical panel swiveling according to one, two and three rotation axes orthogonal to each other and translatable according to one, two or three axes of translation orthogonal to each other with respect to the support frame 4 and is thus positionable so that the ADAS camera of the mentioned vehicle frames in its field of view an active surface of the calibration panel; the rotatory movement about the mentioned axes of rotation and the translatory movement along the mentioned axes of translation may take place with manual controls or be automated through the use of motors or actuators controlled by the electronic processor 201; finally, it should be noted that the calibration panel 7 has an active surface 7*a* intended to face the ADAS camera of the vehicle present in the control area: on said active surface are present or showable a plurality of known graphical elements 7*b*, having known position and orientation on the same active surface; in other words the computerized system 200 is configured for knowing the graphical elements 7*b* and their position and orientation on the active surface 7*a* of the calibration panel; for example the calibration panel may be a display connected to the computerized system 200 which is configured for generating on the display a viewing of such known graphical elements 7*b*.

The advanced guidance system of the vehicle V present in the control area 103 may also comprise at least one ADAS radar: in order to allow the calibration of the ADAS radar, the calibration device 2 may also comprise as further calibration element a reflective panel or mirror 8, mounted in an orientable manner on the support frame, configured for reflecting electromagnetic waves emitted by said ADAS radar and then for being used to calibrate the ADAS radar of the mentioned vehicle. For example, the reflective panel 3 may be mounted on the support frame 4 so as to be orientable about one, two or three axes of rotation orthogonal to each other and so as to be translatable along one, two or three axes of translation orthogonal to each other; also in this case, the rotatory movement about the mentioned axes of rotation and the translatory movement along the mentioned axes of translation may take place with manual controls or be automated thanks to the use of motors or actuators controlled by the electronic processor 201; in an embodiment the reflective panel 8 and the calibration panel 7 (in general two or more calibration elements carried by the support frame 4) may be fixed to each other and commonly orientable and/or translatable with respect to the support frame 4 of the calibration device 2.

In general, then, the support frame 4 carries one or more calibration elements (for example the panel 7, the mirror 8 or still other) that are constrained:

- both pivotally with respect to the support frame itself, for example so as to rotate relatively to three axes of rotation orthogonal to each other (identified in the figures by the curved arrows R1, R2, R3 showing the rotation about each respective axis) so as to allow any type of angular orientation with respect to the frame),
- and translationally (for example along three axes of translation orthogonal to each other T1, T2 or T3, that may be distinguished from or coincide with the axes of rotation, so as to also allow the necessary translational movements). The rotational movement, for example about one or more axes of rotation, may be performed manually, for example by acting on one or more first manual positioners (such as angularly adjustable hinges, regulation screws, manually operated pushers or others) or automatically thanks to one or more first automatic positioners 61, 62, 63 (such as motors or actuators, for example electric motors or actuators) controlled by the electronic processor 201 that may operate remotely or comprise a dedicated controller 201*a* physically carried by the calibration device. Analogously, the translation, for example along one or more axes T1, T2, T3 may be performed manually, for example by acting on second manual positioners 64, 65, 66 (such as skids, regulation screws, manually operated pushers or others) or automatically thanks to second automatic positioners (such as motors or actuators, for example motors or electric actuators) controlled remotely by the electronic processor 201 or from the dedicated controller 201*a* present on the calibration device.

In an embodiment, the support frame 4 is carried by or comprises a carriage 50 configured to be movable on the fixed base surface or floor 102. The carriage may be manually moved by the thrust of an operator or may be provided with a motorization system and an automated control of the movement. In more detail, the carriage may present one or more locomotion elements 51 as wheels and/or tracks (or other locomotion elements) that allow its movement for example on the surface defined by the floor 102. In the case of the carriage 50 motorized and with automated control of the movement, the locomotion elements are connected to at least one motor 52, for example an electric motor, that activates their movement and which is controlled by the electronic processor 201 or by a dedicated controller present on the calibration device and serving the electronic processor 201. In greater detail, the carriage may comprise one or more directionable wheels controlled by a steering gear 53 serving too and controlled by the electronic processor 201 or by a dedicated controller present on the calibration device and serving the electronic processor 201. Alternatively or in combination, the carriage may comprise different locomotion elements, for example three or more wheels, two or more tracks, a combination of two or more tracks and one or more wheels, wherein each locomotion element is provided with a respective electric motor 52 controllable in an independent manner to define any trajectory in the plane of the movement of the carriage itself.

As already discussed, the calibration apparatus 1 comprises the computerized system 200 (schematically represented for example in FIGS. 1, 2, 2A and 3 with a block and for example implementable with a PC or with a tablet or with one or more computerized devices of other nature) that cooperates with each calibration device 2 in order to allow an adequate positioning of the calibration device itself with respect to the vehicle present in the control area 103. The computerized system 200 is provided with at least one electronic processor 201 including one or more CPUs 202 and one or more memories 203 connected communicatively with the CPU or CPUs of the electronic processor. The memory or the memories may for example contain instructions which, when performed by the CPU or CPUs, configure the electronic processor 201 and thus the computerized system 200 to coordinate the functioning of the apparatus 1 so as to perform the operations or steps of positioning of each calibration device 2, as it will be described below. Although in the attached figures the computerized system is represented by a single block physically detached from the calibration device, nothing excludes that the computerized system may be physically on board of the calibration device 2 or that the computerized system comprises a part physically detached from the calibration device and a part on board of the calibration device itself. Moreover, as already mentioned, although the attached figures show an electronic processor and one memory it is possible to provide a computerized system provided with two or more electronic processors and with two or more memories.

As it will be further detailed, the computerized system 200 and for example the electronic processor 201 may be programmed or configured for determining the correct position and orientation that the calibration device and for example each calibration elements must assume with respect to the vehicle V subjected to testing, in order to allow the calibration of the sensors possibly present on the vehicle itself.

The computerized system 200, in the specific example the electronic processor 201, may also be programmed or configured so that, once determined the correct position and orientation that the calibration device and for example each of the calibration elements must assume with respect to the vehicle V subjected to testing, said system 200 (in the instant example the electronic processor 201) automatically commands the movement of each calibration element about the one or more axes (see curved arrows R1, R2 and R3), by acting on one or more first automatic positioners 61, 62 and 63, and the translational movement, for example along the one or more axes T1, T2 and T3, by acting on one or more second automatic positioners 64, 65 and 66.

If the calibration device is also provided with carriage 50 motorized and with automated control of the movement, the electronic processor may be configured for commanding the carriage 50 in order to position the calibration device 2 on the plane, for example of the floor 102, in front of or behind the to the vehicle V under testing, thereby making a first positioning, for example of a rough type, of the calibration device with respect to the vehicle, and then commanding one or more of the first positioners 61, 62 and 63 and/or one or more of the second positioners 64, 65 and 66 in order to perform a precision positioning and orientation of the calibration device 2 or of each of the calibration members carried by the latter.

Hereinafter it will be indicated the description of the determination of the positioning/orientation of the device(s) 2 according to the aspects of the present finding. It should be noted, however, that the above-described aspect of automatic positioning of the calibration device (and of each of the calibration members carried by it) may also be used with methods and/or devices for determining the correct positioning of the device(s) 2 different with respect to those described.

In greater detail, in order to determine whether the device or the calibration devices 2 are correctly positioned and oriented or not with respect to the vehicle V, the computerized system 200 must know:

- the position and the orientation of the vehicle V or of one or more element characteristic of the vehicle (that allow to trace the position of the vehicle) in a common reference system, here indicated as XYZ, that is shared by the vehicle V and by each calibration device 2, and
- the position and the orientation with respect to the same common reference system XYZ of each (or of at least one) of the above-described location targets 3.

Figure 2A:
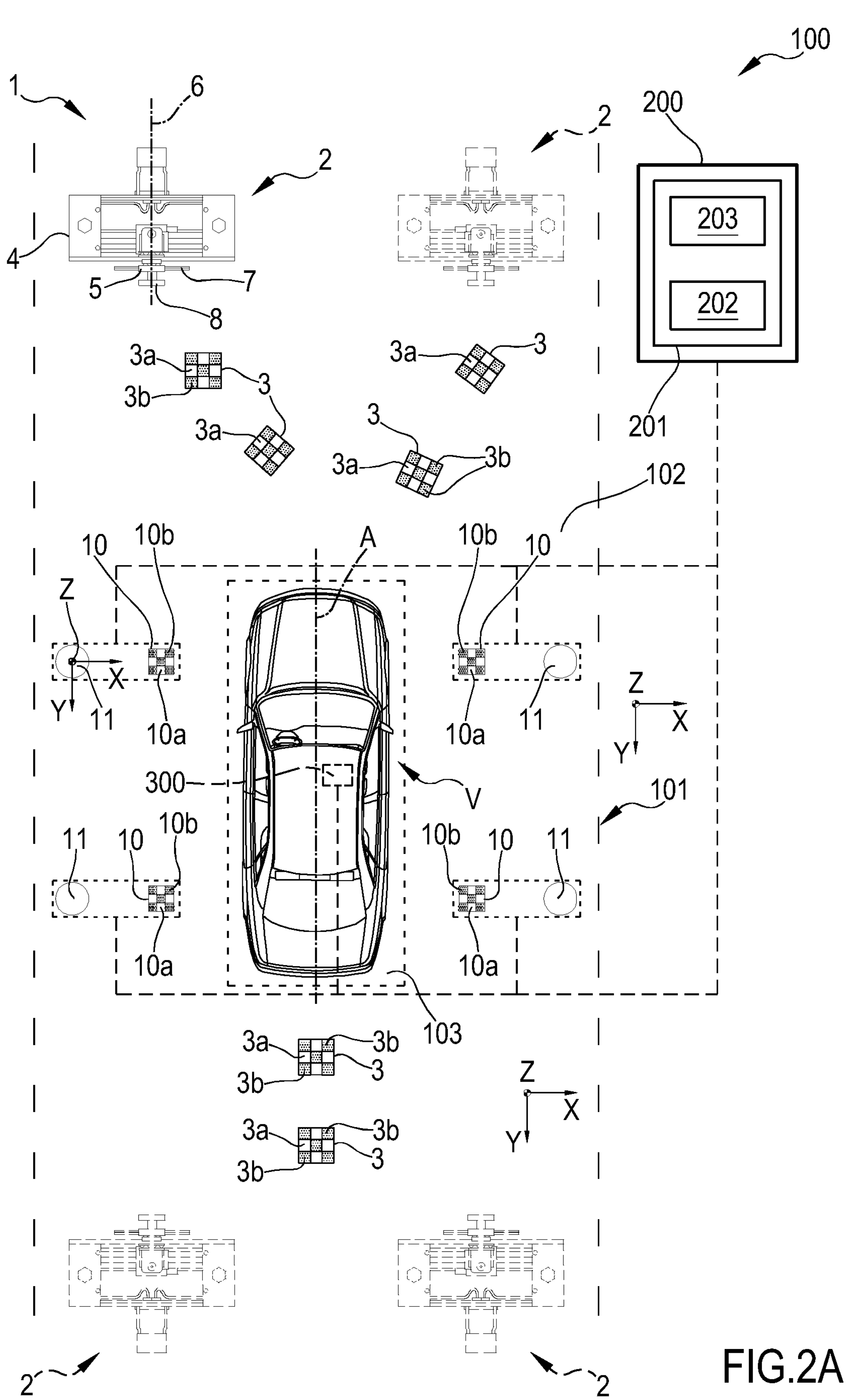
FIG. 2A is a schematic plan view of a variant of a second embodiment of a vehicle test bay using a calibration apparatus for one or more vehicular sensors, according to aspects of the invention.

It is noted that the common reference system XYZ may for example be a Cartesian system fixed to a known point of the control area 103 or to a known point of the bay 100 and surrounding the control area 103 (by way of example in FIGS. 1, 2 and 2A various possible positions of the reference system XYZ are shown that in the specific case is of Cartesian type even though nothing excludes the use of reference systems of another nature). The common reference system XYZ is so defined because said common reference system are referred to the position of the vehicle V, of each device 2, of the reference targets 3 and of the additional components of the apparatus 1 below described. The position of the origin and the orientation of the common reference system may be chosen at will, as long as they are defined and known, in FIGS. 1 and 2 are represented three possible positions of said common reference system.

If for example the position and orientation of the vehicle with respect to the common reference system XYZ are already known (for example as already determined for example thanks to prior alignment and/or localization procedures of the vehicle V), the computerized system 200 is configured for receiving, for example from a memory of the system itself or from a unit outside of the system 200, data representative of these position and orientation of the vehicle V with respect to the common reference system XYZ.

If vice versa the computerized system 200 does not know or is not able to receive the data representative of the position and of the orientation of the vehicle V in the common reference system XYZ, the computerized system (and in detail the electronic processor 201) is configured for determining the data representative of the position and orientation of the vehicle, with respect to the common reference system XYZ, as shown below.

For this purpose, as shown by FIGS. 1 and 2, the apparatus 1 may comprise one or more reference targets 10, directly or indirectly fixed to the fixed base surface or floor 102, lateral to the control area 103 where it is positioned the vehicle V. The position and the orientation of each of the reference targets 10 with respect to the common reference system XYZ may be known to the computerized system (for example stored in an its memory or receivable from an outer unit) or determinable with a suitable procedure performed one-off that provides also the determination of the position and of the orientation with respect to the common reference system XYZ itself of the location target(s) 3, as it will be explained later.

The apparatus 1 may comprise also one or more image detectors 11, positionable too, when in use, in a fixed position with respect to the fixed base surface or floor, located lateral to the control area (in other words the image detectors may be detachable from the base or floor, but when such detectors 11 are to be used, they are constrained relative to the floor or the fixed base as it will be detailed below. Each image detector 11 is placed in proximity to a respective reference target 10, so that each pair formed by an image detector 11 and from the respective reference target 10 is configured so that the image detector has a field of view that frames both the respective reference target 10 and at least a respective portion of the side of the vehicle V present in said control area 103. It is noted that in FIGS. 1 and 2 are provided two reference targets 10 and two corresponding image detectors 11 for each side of the vehicle; however, it is not excluded that it may be used only one reference target 10 and a single corresponding image detector 11 for each side of the vehicle V.

Figures 4, 5:
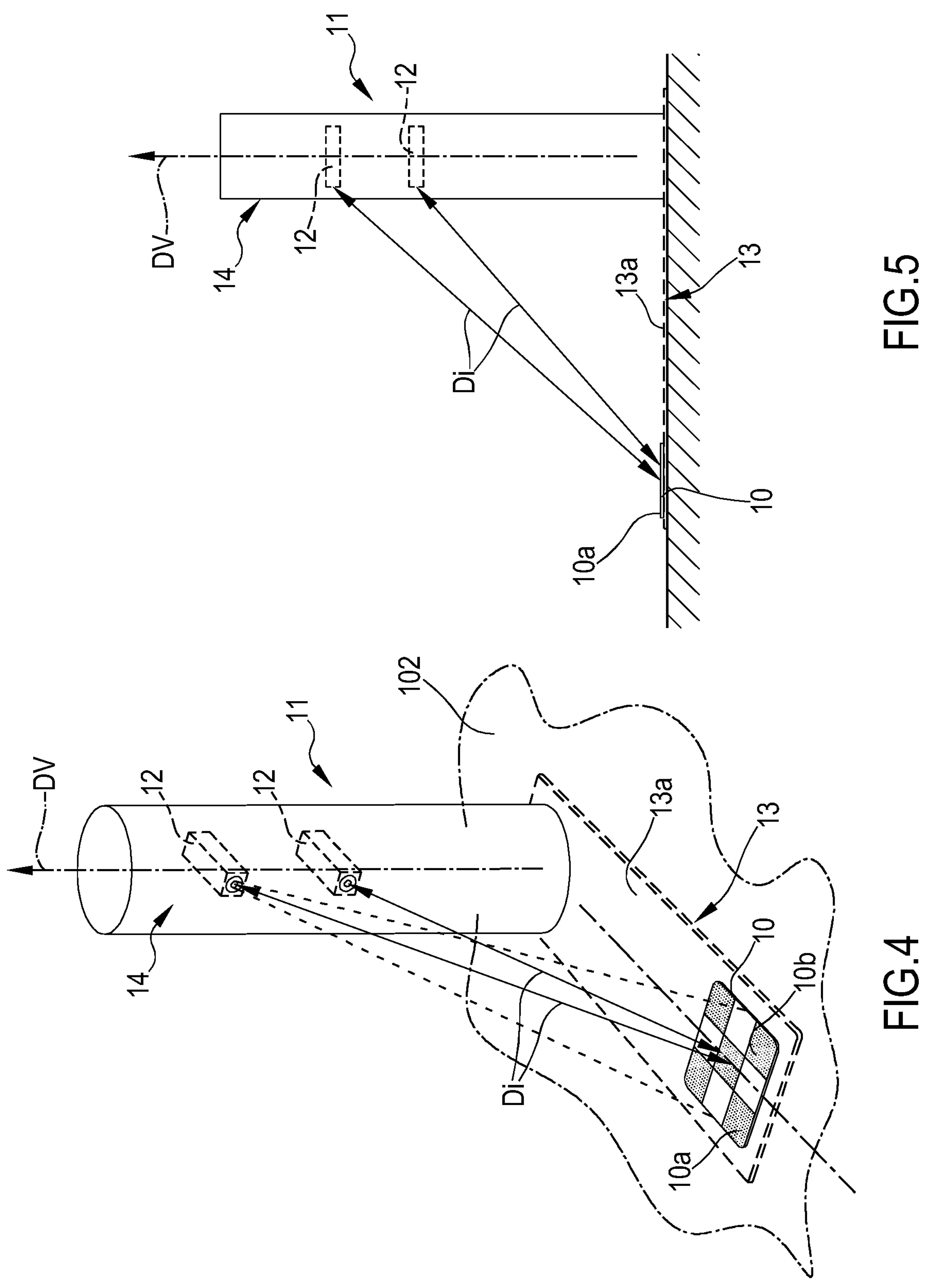
FIG. 4 is a perspective view a component of the apparatus 1 intended to support an image detector and a reference target, according to further aspects of the invention.
FIG. 5 is a profile view of the component of the apparatus 1 shown in FIG. 4.

In greater detail, as shown in FIGS. 4 and 5, each image detector comprises two or more cameras 12, mounted in a known and fixed relative position; the two or more cameras are optionally laid on a same rigid support 13, so that the distance between the two or more cameras and relative orientation of the optical axes of the two or more cameras 12 of the same image detector 11 are predetermined and known. The two or more cameras 12 of a same image detector are configured for cooperating between them capturing images of the same respective portion of side of the vehicle, defining a multi-ocular stereo vision system. With the use of known algorithms (see for example the text "Digital Image Processing, 4Th Edition Flexible cover—Jan. 1, 2019 by Rafael C. Gonzalez et al.) from the images detected by the multi-ocular stereo vision system it is possible to identify and thus to obtain the position and orientation of components such as wheels, or parts of them, present in the portion of the side of the observed vehicle.

It is noted that, according to an aspect, at least one of the two cameras 12 of a same image detector 11 is configured for framing both the respective portion of the side of the vehicle and the respective reference target. In a further aspect, the electronic processor 201 is configured for commanding said camera 12 to simultaneously capture both an image of the respective reference target and of the respective portion of the side of the vehicle so that eventual one or more compensations of position of the detector 11 may be automatically calculated by the electronic processor based on of the respective reference target 10. Although reference targets 10 and detectors 11 are positioned with the utmost care, it is not excluded that there may be small relative positioning deviations or movements during use that could affect measurements.

In the currently preferred form, each reference target 10 is a target of planar shape, for example a thin flat plate or a planar film (and thus show a thickness for example in the range of 1-20 mm and in any case much less with respect to the two other dimensions of the target itself) also whether other conformations may be used. Each target 10 has an exposed surface 10*a* provided with a plurality of prefixed graphic elements 10*b*, for example arranged in a checkerboard pattern, each of the prefixed graphic elements 10*b* is known to the system 200 and has position and orientation on said exposed surface too known to the computerized system 200.

The reference targets may be fixed directly to the base surface 102. Alternatively, for each image detector 11 may be provided a plate shaped element 13, fixed stably on the base surface 102 in a position adjacent to one side of the vehicle, having an upper surface 13*a* where it is arranged in fixed position and orientation the respective reference target 10, plate-shaped or of laminar conformation too. A column 14 is superiorly coupled to the plate shaped element 13 emerging, optionally according to a vertical direction DV, from the plate shaped element. Said column that is engaged removably or constrained (for example in a removable manner) to the plate shaped element however forms a prefixed angle with the latter when in operating position so that the detector 11 or each of the cameras 12 are at respective and pre-fixed distances Di from the center or other prefixed point of the exposed surface 10*a* of the respective reference target 10. Each image detector 12 is stably coupled to the respective column 14 and is configured so as to acquire the image of the reference target 10 present on the underlying plate shape element. It is noted that the column 14 has perfectly controlled sizes and houses the image detector, i.e., the at least two or more cameras 12, in positions and relative orientations fixed and perfectly defined among them. Basically, the column defines a rigid support to which are fixed the one or more cameras 12 of a same image detector 11: these cameras are placed in spaced apart positions, optionally vertically, from each other.

Figure 9:
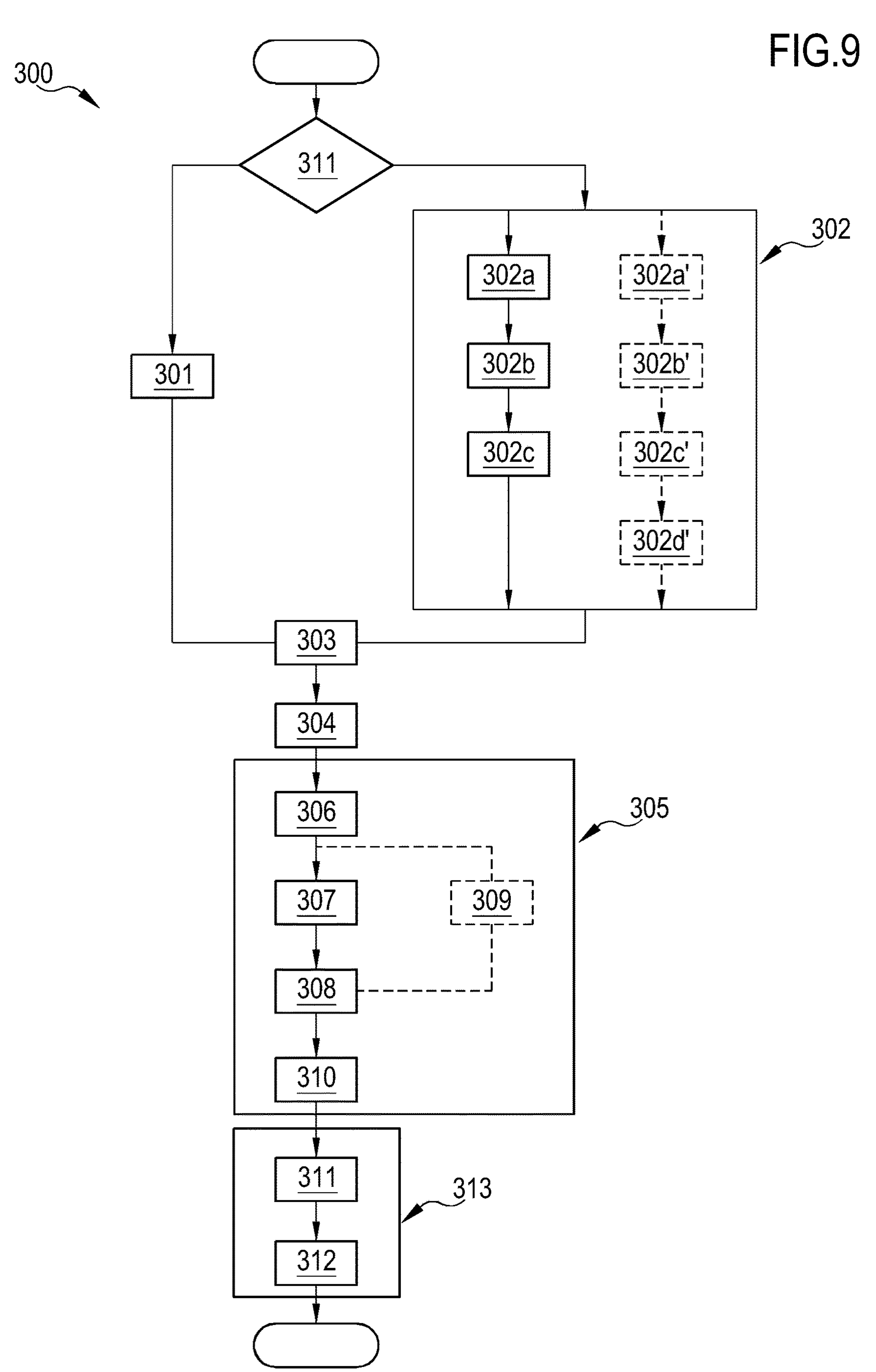
FIG. 9 is a flowchart relative to a method of verifying the positioning of a calibration device for one or more vehicular sensors, for example performable by the calibration apparatus 1 according to other aspects of the invention.

After what has been described in a mainly structural manner, it is now shown, with reference to the example flowchart of FIG. 9, the method 300 of verifying the positioning put in place by the above-described calibration apparatus 1. As already indicated, the considered method 300 is performed by the computerized system 200.

Initially, the computerized system 200 verifies the availability or not (step 311 in FIG. 9) of the data representative of the position and orientation of the location target(s) 3 with respect to the common reference system XYZ and of the data representative of the position and orientation of the reference target(s) 10 with respect to the common reference system itself. In the affirmative, the computerized system 200 retrieves from its memory or receives (step 301 in FIG. 9) from an outer unit the data representative of the position and orientation of the location target(s) 3 with respect to the common reference system XYZ and the data representative of the position and orientation of the reference target(s) 10 with respect to the common reference system itself. If such data are not available or there is the suspicion that such data are not correct, the electronic processor 201 is configured for performing, automatically or upon receipt of a specific command, a procedure (that is practically a general calibration procedure of the bay 100 performed once and is schematically represented by the block 302 in FIG. 9) aimed at determining position and orientation, in said common reference system, of the location target(s) 3 and of the reference target(s) 10 placed lateral to each longitudinal side of the control area 103. It should be noted that these steps are advantageously performed only rarely and not at each positioning of a calibration device 2 with respect to a respective vehicle that reach the bay 100 for the calibration of their sensors ADAS. In fact, according to the aspects of the invention, the targets 3 and 10 are fixed to the ground (i.e. to the bearing surface or plane 102) and are of thin and planar conformation (and thus walkable by a vehicle without suffering distortions or movements) and thus once that their position and orientation with respect to the mentioned common reference system XYZ are one-off determined during the calibration of the bay 100, these positions and orientations of the targets 3 and 10 are not to be detected again.

The calibration procedure 302 aimed at determining the positioning and the orientation of the location targets 3 and of the reference targets 10 may be any procedure able to determine with extreme precision the position and orientation of each of said targets 3 and 10 with respect to the common reference system XYZ.

Nothing excludes that said procedure provides for a manual measurement of angular position and orientation of each target on the base surface and with respect to the common reference system provided that said measurement is performed with extreme precision.

Figure 6:
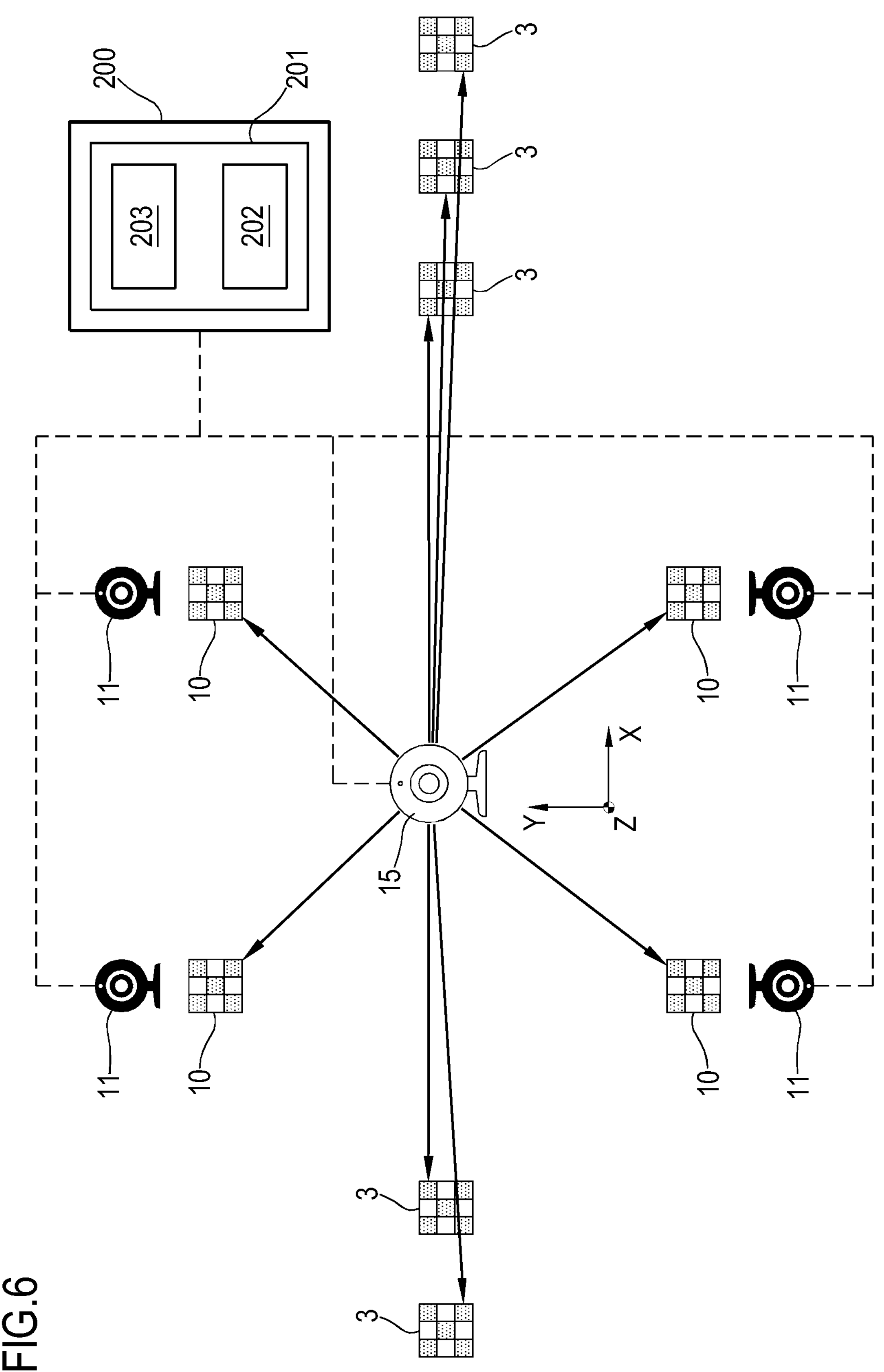
FIGS. 6 and 7 show schematically and in plan view two embodiment variants of a calibration system usable for the initial calibration of the test bay shown in FIGS. 1 and 2, according to further aspects of the invention.

In a possible alternative embodiment of the calibration procedure 302 (shown in FIG. 6), the apparatus i.e. the electronic processor 201 of the computerized system 200 is configured also for performing an initial step of determining the data representative of the position and orientation, in the common reference system XYZ, of the reference targets 10 placed on each longitudinal side of the control area and of the one or more location targets 3 placed in front of or behind the control area 103. In this case, the apparatus comprises one or more dedicated image detectors 15 (for example one or more cameras), placed in known position and orientation in the common reference system XYZ and able to display in its field of view the reference targets and/or the location targets. Whether for example it is used only one camera as dedicated image detectors 15 said camera must be appropriately positioned in a place known as for position and orientation in the common reference system XYZ and must have a field of view able to display all the reference targets and all the location targets. For example, said single camera may be placed in an elevated location with respect to the base surface and to the control area: a possible solution may be providing that the camera is positioned in an area of the bay 100 at a height of a few meters with respect to the base surface.

The control system i.e. the electronic processor 201 is configured for performing the initial calibration procedure of position determination of the targets 3 and 10 that comprises the following steps:

observing each of said one or more reference targets 10 and of said location targets 3 with the one or more dedicated image detectors 15 (step 302*a*), detecting, with these one or more dedicated image detectors 15, respective one or more images of the reference targets 10 and respective one or more images of the location targets 3 (302*b*), and determining, based on the position and orientation in the common reference system XYZ of said one or more dedicated image detectors 15 and of one or more images detected by them of each reference target 10, data representative of the position and orientation in said common reference system of the one or more reference targets 10 placed on each longitudinal side of the control area 103; as well as determining, based on the position and orientation in the common reference system XYZ of said one or more dedicated image detectors 15 and of the one or more images detected by them of each location target 3, data representative of the position and orientation in said common reference system of the one or more location targets placed in front of and/or behind the control area 103 (step 302*c*).

Advantageously, if the one or more dedicated image detectors 15 are positioned in a sufficiently elevated area with respect to the control area and to the fixed base surface or floor, so as to frame in its field of view each of the reference targets 10 and each of the location targets 3 also in presence of a vehicle in the control area, the calibration procedure may be performed also with the vehicle in the control area and possibly with only one image detector, for example with only one camera.

It is noted that if the position and the orientation with respect to the common reference system of one or more cameras of each of the detectors 11 above-described are known, then one or more of said image detectors may be used to instead of the detector(s) 15 following exactly the same procedure as above shown.

Figure 7:
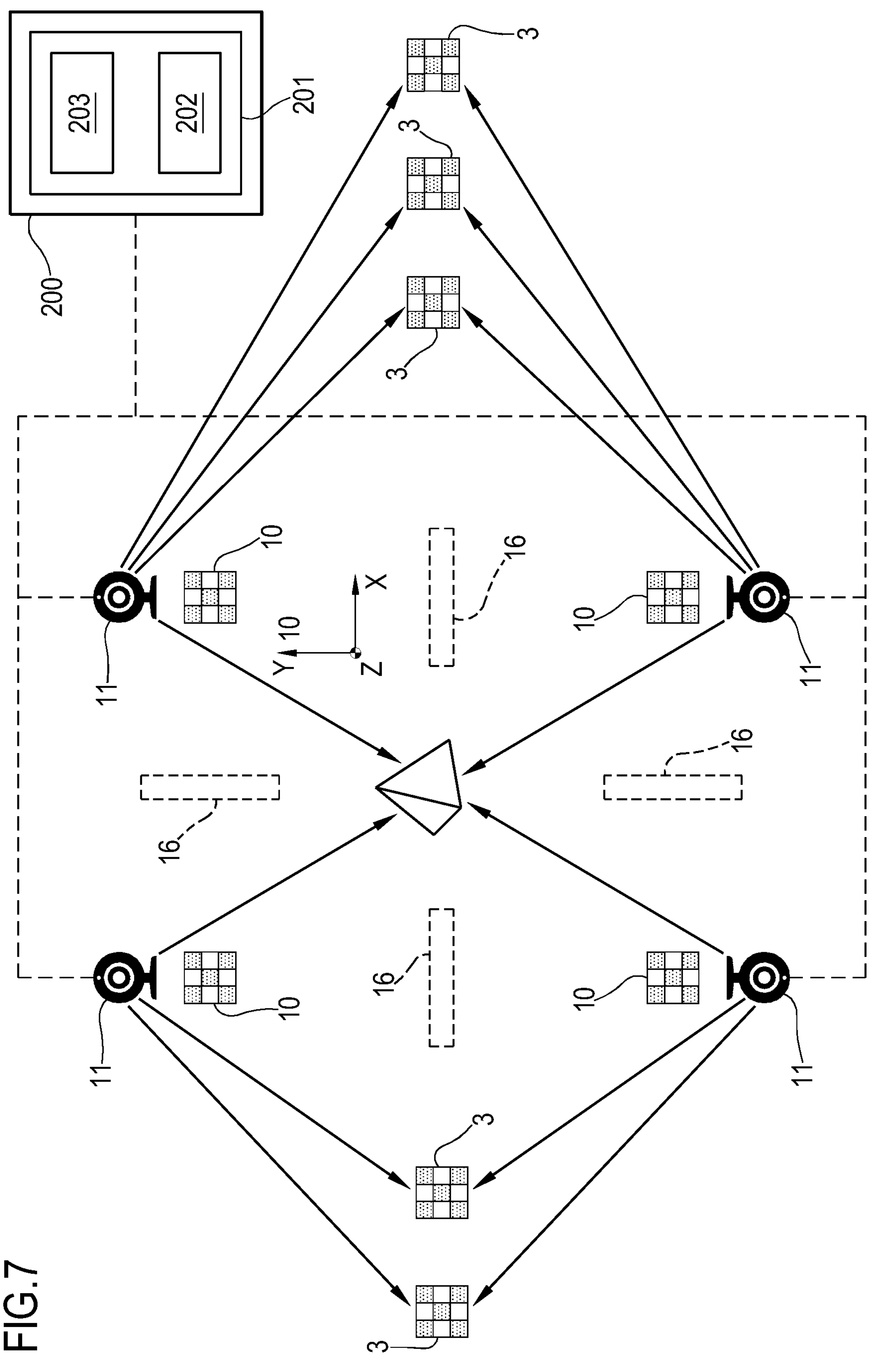
Figure 8:
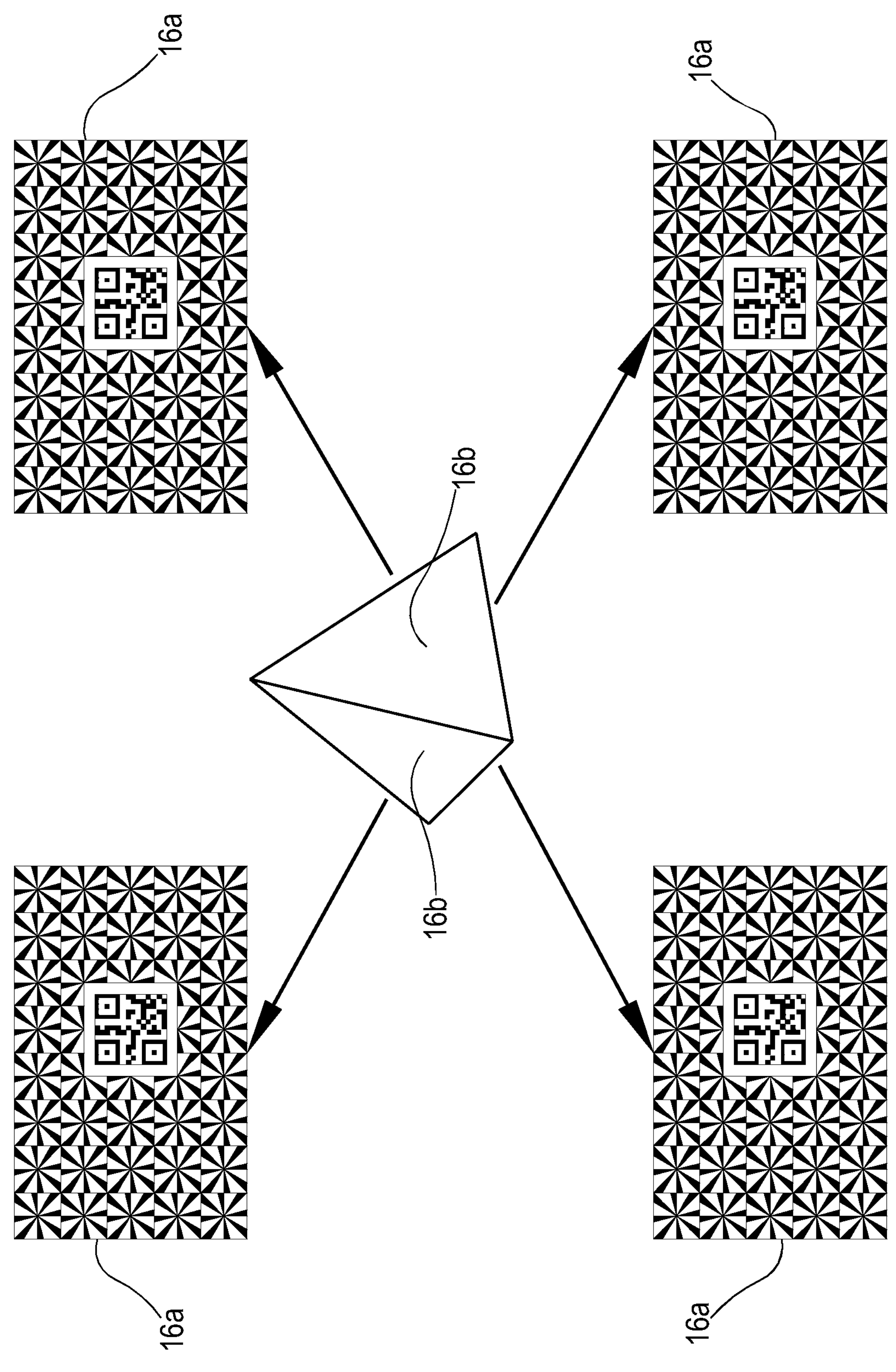
FIG. 8 shows a detail of FIG. 7.

According to a further possible variant embodiment of the calibration procedure, shown in FIGS. 7 and 8, the apparatus 1 comprises one or more known common targets 16: i.e. targets whose geometry is known and whose graphical representations present on the surface of the common targets 16 themselves are known. Optionally, the common targets are located in known position and orientation (i.e. known to the system 200) with respect to the common reference system XYZ.

The known common target(s) 16 are displayable by image detectors 11 and may be a single multi-faceted target as shown in FIGS. 7 and 8 bearing on each face 16*b* known graphisms 16*a* to the system 200 (for example identical graphisms on each face), or known two-sided common targets (represented in a discontinuous line in FIG. 7) bearing on each face graphisms known to the system 200 (for example identical graphisms on each face) positionable between each pair of the image detectors 11. In this case the electronic processor is configured for performing an initial calibration procedure (302) that comprises:

detecting with one or more image detectors 11 respective images of the one or more common targets 16 (step 302*a*'), determining, based on the images of the one or more common targets 16 taken by the one or more image detectors 11, data representative of the position and orientation in the common reference system of said one or more image detectors 11 (step 302*b*')

deriving data representative of the position and orientation of each reference target 10 in the common reference system XYZ based on one or more images of the respective reference target 10 detected by the corresponding image detector 11 (step 302*c*'), and deriving data representative of the position and orientation of each location target 3 in the common reference system XYZ based on one or more images of the respective location target detected from the one or more image detectors 11 (step 302*d*').

Advantageously, the one or more common targets 16 may be positioned in an elevated area with respect to the control area and to the fixed base surface or floor and/or in a position capable of being framed in the field of view of each of the image detectors facilitating thus the positioning of the targets 16 (for example also in presence of a vehicle in the control area 103).

As previously mentioned, at the moment of performing the positioning of the calibration device 2 the computerized system 200 could also already know the position of the vehicle V with respect to the common reference system: in this case, neither the above-described procedures will be carried out nor obviously the determination of the position of the vehicle present in the control area 103 with respect to the common reference system. In general, however, when a new vehicle reaches the bay 100 and the relative ADAS systems must be calibrated it is not known precisely the position of the vehicle, nor whether the vehicle has a correct alignment condition (i.e. whether the actual values of quantities such as, for example, convergence angle (Toe), camber angle (Camber), caster angle (Caster), included angle, thrust angle, wheelbase difference are adequate).

Therefore, under the assumption that the initial calibration procedure aimed at determining the position and the orientation is of the reference targets 10, that of the location targets 3 are performed at the time, and that thus the computerized system 200 knows the positions and the orientation in the common reference system of the targets 3 and 10, the apparatus 1 and, in the example here described, the electronic processor 201 of the computerized system 200 coordinates the execution of localization procedures of the vehicle (represented in FIG. 9 from the block 303) and possible regulation of its alignment (step 304 in FIG. 9).

In order to locate the vehicle (block 303 in FIG. 9), the electronic processor 201 performs a step of determining data representative of the position and orientation of the vehicle V with respect to the common reference system XYZ.

Said step provides for determining data representative of the position and orientation with respect to said common reference system of at least one characteristic element for each side of the vehicle (for example is position and orientation of one or both the wheels for each side of the vehicle) using, for each side of the vehicle, one or more pairs formed by the image detector 10 and by the respective reference target 11.

In greater detail the step of determining for each side of the vehicle data representative of the position and orientation of at least one characteristic element (for example of a wheel) of the vehicle with respect to the common reference system XYZ comprises for each pair formed by the image detector 11 and by the respective reference target 10 the sub-steps of:

detecting with the image detector 11 one or more images of the portion of the side of the vehicle that the detector 11 is facing, detecting always with the same image detector 11 one or more images of the respective reference target 10 placed in proximity of the detector 11, and obtaining the data representative of the position and orientation of the vehicle in the common reference system based on said one or more images of said at least one portion of the side of the vehicle and said one or more images of the respective reference target.

In order to obtain the data representative of the position and orientation of each characteristic element of interest in the common reference system, the electronic processor 201 also takes into account the position and orientation of the reference targets 10 i.e. of the data representative of the position and orientation in said common reference system (data that as above said are known to the system or determined during the general calibration of the bay 100) of the reference target 10 of each pair formed by the image detector 11 and by the respective reference target 10.

For example, for each pair formed by the image detector and by the respective reference target the electronic processor 201, in first instance, provides for determining data representative of the position and orientation of one or two right wheels of the vehicle with respect to an image detector 11 operating on the right of the vehicle based on one or more images of the portion of the right side of the vehicle itself observed from the detector 11 concerned; the electronic processor 201 provides also for determining the data representative of the position and orientation of the reference target 10, always with respect to the image detector 11 itself based on one or more images of the respective reference target (detected simultaneously with when one or more images of the portion of the side of the vehicle are detected); subsequently, the electronic processor 201 may determine the data representative of the position and orientation of the right wheels of the vehicle V in the common reference system XYZ based on what was determined in first instance and on the knowledge of position and orientation, in the common reference system XYZ, of the reference target 10 of each pair involved in the detection and formed by image detector 11 and respective reference target 10. The same may be performed on the left side of the vehicle V using the one or more pairs of detectors-reference targets present lateral to the left side of the control area 103.

The data representative of the position and orientation of the vehicle V, with respect to the common reference system, define (or allow the electronic processor to trace back to) position and orientation of the vehicle in the common reference system XYZ.

From a practical point of view, the characteristic element of the vehicle that is detected may comprise a right front wheel of the vehicle, a right rear wheel of the vehicle, a left front wheel of the vehicle, a left rear wheel of the vehicle. In other words, the electronic processor 201 may determine with respect to the common reference system XYZ the measured values assumed by a set of positional parameters chosen among:

- position and orientation of a right front wheel of the vehicle,
- position and orientation of a right rear wheel of the vehicle,
- position and orientation of a left front wheel of the vehicle,
- position and orientation of a left rear wheel of the vehicle,
- position and orientation of a left front wheel and a right front wheel of the vehicle,
- position and orientation of a left rear wheel and a right rear wheel of the vehicle, and
- position and orientation of a left front wheel and a right front wheel of the vehicle, as well as position and orientation of a left rear wheel and a right rear wheel of the vehicle.

In order to determine the data representative of the position and orientation of the with respect to the common reference system XYZ the electronic processor may also determine the measured values assumed by a set of additional positional parameters chosen among:

- position and orientation of a vehicle rear axle,
- position and orientation of the longitudinal centerline of said vehicle,
- position and orientation of the thrust axis of said vehicle,
- position of a predetermined element of the vehicle or fixed to the vehicle,
- position and orientation of each front wheel of the vehicle and position and orientation of each rear wheel of said vehicle,
- position and orientation of a front axle of the vehicle and position and orientation of a vehicle rear axle,
- position and orientation of the longitudinal centerline of said vehicle, and position and orientation of the thrust axis of said vehicle,
- position and orientation of each front wheel of the vehicle, position and orientation of each rear wheel of said vehicle, position and orientation of a front axle of the vehicle, position and orientation of a vehicle rear axle, and
- position and orientation of each front wheel of the vehicle, position and orientation of each rear wheel of said vehicle, position and orientation of a front axle of the vehicle, position and orientation of a vehicle rear axle, position and orientation of the longitudinal centerline of said vehicle, position and orientation of the thrust axis of said vehicle.

In a currently preferred embodiment, the electronic processor 201 provides for determining position and orientation in the common reference system of the at least two front wheels and of at least two rear wheels and thus derives the position of the front and rear axles, of the longitudinal centerline and of the thrust axis of the vehicle V, and then derives the position and the orientation of the vehicle itself in the common reference system XYZ.

Once the position and the orientation of the vehicle are determined the electronic processor may perform the additional steps of:

- determining a reference system fixed to the vehicle (that may be obtained with rototranslation procedures being known at this point the position of the vehicle V in the common reference system XYZ) having at least two reference axes lying on a vertical plane through the longitudinal centerline of the vehicle and a third axis perpendicular to said vertical plane, and
- re-calculating the measured values of said set of positional parameters and/or of said set of additional positional parameters with respect to the reference system fixed to the vehicle.

Subsequently the electronic processor may perform, as already mentioned, an alignment or alignment control procedure (block 304 in FIG. 9) that provides for:

- comparing one or more measured values of said set of positional parameters and/or of said set of additional positional parameters determined with respect to the reference system fixed to the vehicle with a corresponding set of reference values or ranges,
- determining possible discrepancies between one or more measured values of said set of positional parameters and/or of said set of additional positional parameters and respective one or more reference values or ranges, and in case there are discrepancies between one or more measured values of said set of positional parameters and/or of said set of additional positional parameters and respective one or more reference values or ranges, commanding the execution or performing a correction procedure that brings the one or more measured values of said set of positional parameters and/or of said set of additional positional parameters determined with respect to the reference system fixed to the vehicle to meet the respective one or more optimal values or ranges.

Once the procedures of determining the position and orientation of the vehicle V (procedure 303) and the eventual control and alignment adjustment procedure (procedure 304) are completed, it is possible to proceed with verifying the positioning of the or of each calibration device 2 intended, once appropriately positioned, to be used for calibrating one or more sensors on the vehicle.

For this purpose, the computerized system performs the method of verifying the positioning (block 305 in FIG. 9) of each calibration device 2 described below. Practically, the concerned method provides that the computerized system 200, knowing the data representative of the position and orientation with respect to the common reference system XYZ of each of the location target above-described and also the data representative of the position and orientation of the vehicle V in the common reference system XYZ, provides for recalling such data from the memory (step 306 of the block 305).

The electronic processor obtains also (step 307 of the block 305) one or more detections of the location target(s) using the sensor(s) 5 fixed to said calibration device 2, and obtains (step 308 of the block 305) data representative of the current position and orientation of the calibration device 2 with respect to the common reference system XYZ based on:

these data representative of the position and orientation, in the common reference system, of the location target (s) 3, and the one or more detections of the location target(s) 3 obtained from the sensor 5 fixed to said calibration device 3.

It is noted that in the shown exemplary embodiments the sensor fixed to the calibration device comprises one or more optical sensors fixed to said calibration device. In this case, the step of obtaining one or more detections of the location target with the sensor 5 comprises obtaining one or more images of the location target using the one or more optical sensors, and the step of obtaining data representative of the current position and orientation of the calibration device with respect to the common reference system is performed based on of the data representative of the position and orientation, in the common reference system, of the location target, and of the one or more images of the location target obtained from the one or more optical sensors fixed to said calibration device. It should be also noted the electronic processor may perform an intermediate step of determining data representative of the relative position and orientation of the calibration device with respect to the at least one location target based on of the one or more detections of the location targets 3 obtained from the sensor 5 (for example based on the one or more images of the location target 3 obtained from the one or more optical sensors) and then obtaining the data representative of the current position and orientation of the calibration device 2 with respect to the common reference based on:

said data representative of the position and orientation, in the common reference system XYZ, of the location target 3, and said data representative of the relative position and orientation of the calibration device 2 with respect to the location target 3.

In other words, the images of the location target, together with the knowledge of the position of the location target in the common reference system allow to determine the position and the orientation of the calibration device 2 in the common reference system XYZ with respect to which it is also known the position of the vehicle V.

It should be noted that, the calibration device 2 herein described it is assumed that it comprises one or more calibration members (in this case for example the calibration panel 7 and/or the calibration mirror 8) mounted to the support frame so that, once appropriately positioned and oriented the calibration device, all the calibration members carried by it are consequently appropriately oriented and positioned. It goes without saying that if the calibration device should comprise calibration members movable independently from each other and in relative positions not known in advance, each calibration member must be considered as an independent calibration device and thus independently positioned and oriented.

Finally, the electronic processor is configured for verifying (step 310 of the block 305) whether the current position and orientation of the calibration device 2 as above determined are correct or not. The step of verifying is performed based on of the data representative of the current position and orientation of the calibration device 2 in the common reference system XYZ, of the data representative of the position and orientation of the at least one characteristic element of the vehicle in the common reference system, and of reference values or ranges that determine a correct position and orientation of the calibration device 2 with respect to the vehicle V.

If the position and/or the orientation are not correct, the electronic processor 201 may, according to another aspect, commanding the execution of a correction procedure 313.

Basically just by “looking” at the location target(s), the apparatus 1 is capable of understanding whether the calibration device 2 is correctly positioned or not with respect to the vehicle present in the control area.

If two or more location targets (front and/or rear with respect to the vehicle positioned in the control area) the position and orientation thereof are known to the computerized system 200 are used, the electronic processor is configured for obtaining detections of the two or more location targets using the sensor 5 for example obtaining images of the location target using the one or more optical sensors of said sensor 5. Optionally, the electronic processor may determine data representative of the relative position and orientation of the calibration device with respect to the two or more location targets 3. Thus, the electronic processor obtains the data representative of the current position and orientation of the calibration device 2 in the common reference system XYZ based on of the detections (for example images) performed on the two or more location targets obtained from the sensor 5 and based on of the data representative of the position and orientation, in the common reference system, of the two or more location targets 3. Also, in this case it may be provided that the calculation of the data representative of the current position and orientation of the calibration device in the common reference system passes through the determination of the data representative of the relative position and orientation of the calibration device 2 with respect to the two or more location targets 3.

As already mentioned, the calibration device 1 may comprise a support frame and one or more optical sensors 5 constrained to the support frame: in this case each optical sensor is arranged and oriented so that the field of view of the optical sensor itself frames one or more, for example all, front location targets to the vehicle or one or more, for example all, rear location targets to the vehicle. In this variant, the electronic processor is configured so that:

- the step of obtaining one or more detections of the location target(s) using a sensor fixed to said calibration device comprises obtaining one or more images of at least one (for example of all) location target using said one or more optical sensors fixed to said calibration device, and
- the step of obtaining data representative of the current position and orientation of the calibration device with respect to said common reference system is performed based on of the data representative of the position and orientation, in the common reference system, of all the location target, and of the one or more images of all the location target obtained from the one or more optical sensors fixed to said calibration device.

Entering now into the details of the nature of the data, as above determined, representative of current position and orientation of the calibration device 2 in said common reference system, it should be noted that these data may comprise measured values of one or more location parameters chosen among:

- height of the calibration panel and/or of the reflective panel (and/or of other calibration element carried by the calibration device and useful for calibrating an ADAS sensor of the vehicle) with respect to the fixed base surface or floor,
- distance of a predetermined point of the calibration panel and/or of the reflective panel (and/or of another calibration element carried by the calibration device and useful for calibrating an ADAS sensor) with respect to a prefixed characteristic element of the vehicle present in the control area, optionally distance of a predetermined point of the calibration panel and/or of the reflective panel (and/or of another calibration element carried by the calibration device and useful for calibrating an ADAS sensor) with respect to the vehicle front axle or to the logo on the front of the vehicle, and
- one or more tilt angles of the calibration panel and/or of the reflective panel (and/or of another calibration element carried by the calibration device and useful for calibrating an ADAS sensor) with respect to the common reference system or to a reference system of the vehicle obtainable from the common reference system, optionally wherein the tilt angles comprise the tilt angles of a plane fixed to the calibration panel and/or to the reflective panel (and/or to another calibration element carried by the calibration device and useful for calibrating an ADAS sensor) with respect to each of the orthogonal planes defined by said common reference system or by said reference system of the vehicle.

In an example, the data representative of the current position and orientation of the calibration device in said common reference system comprise measured values of all the mentioned location parameters.

The electronic processor 201 is more precisely configured for verifying whether the current position and orientation of the calibration device are correct or not performing the following sub-steps of:

- comparing the measured values of the location parameters with respective reference values or ranges, and
- generating one or more respective error signals if there are discrepancies between one or more measured values of the location parameters and the respective reference values or ranges.

As already mentioned, if one or more error signals are generated or if discrepancies are detected between one or more measured values of the location parameters and the respective reference values or ranges, the electronic processor 201 may also be configured for commanding a correction procedure 313 (see again FIG. 9) that brings the one or more measured values to meet the respective reference values or ranges, for example commanding the carriage 50 and one or more actuators or motors of the calibration device controlled by the electronic processor. In addition or alternatively, the electronic processor may generate for each of said one or more error signals a respective optical signal on a screen of a user interface connected to the electronic processor itself: each optical signal may for example have at least one property (for example color, color intensity, numerical value, or graphic size) linked to the magnitude of the respective error signal.

The computerized system 200 (for example the electronic processor 201) may thus also be programmed or configured so that, once the correct position and orientation are determined, the calibration device and for example each of the calibration elements must assume with respect to the vehicle V subjected to testing (block 305 in FIG. 9), said system 200 (for example the electronic processor 201) performs the correction procedure (313 in FIG. 9) automatically controlling:

- the movement of each calibration element about the one or more axes (curved arrows R1, R2 and R3), by acting on one or more first automatic positioners 61, 62 and 63, and
- the translational movement, for example along the one or more axes T1, T2 and T3, by acting on one or more second automatic positioners 64, 65 and 66.

For example, within the correction procedure, the calibration panel 7 and the calibration mirror or reflective panel 8 may be moved translationally on three axes for adjusting the horizontal position on two axes, and vertical on one axis, as well as moved in rotation with respect to a yaw axis, a pitch axis and a roll axis for adjusting the angular position with respect to the vehicle.

If the (or each) calibration device is also provided with carriage 50 motorized and with automated control of the movement, the correction procedure 313 may provide that the electronic processor is configured for commanding the carriage 50 in order to position the calibration device on the plane, for example of the floor 102, in front of or behind the to the vehicle V under testing.

According to a further aspect, the system 200 and in detail the electronic processor 201 may be programmed for performing a correction procedure 313 that provides a combined and particular use of the carriage and of the first and/or second automatic positioners. For example, the electronic processor may be configured for commanding the carriage (actuating for example independently at least two electric motors of the carriage or at least one electric motor and an actuator that manages the steering gear) thereby making a first positioning and orientation (311 in FIG. 9), for example of a rough type, of the calibration device with respect to the vehicle, i.e. a positioning for which there are still discrepancies between one or more measured values of the location parameters and the respective reference values or ranges (i.e. so that the position and the orientation of the calibration device are improved with respect to the starting condition and are, in a manner of speaking, almost correct). The system 200 (for example the electronic processor 201) may be programmed for commanding, once the first positioning and orientation has been performed, one or more of the first positioners and/or one or more of the second positioners in order to perform a second precision positioning and orientation (step 312 in FIG. 9) of the calibration device or of each of the calibration members carried by the latter so that there are no longer discrepancies between one or more measured values of the location parameters and the respective reference values or ranges (i.e. so that the position and the orientation of the calibration device are correct).

The first positioning and orientation and the second positioning and orientation may for example be performed by providing two respective and distinct reference range sets; for example, may be provided a first set of reference ranges (associated to the first positioning) that the electronic controller verifies that is satisfied for the first positioning and orientation: the first reference range comprises relatively wide ranges of acceptability for each of the location parameters; it may also be provided a second set of reference ranges that the electronic controller verifies that is satisfied for the second positioning and orientation: said second set of reference ranges comprises ranges of acceptability for each of the location parameters narrower with respect to the corresponding reference ranges of the first set of reference ranges for each of the location parameters. In this way, the electronic controller may perform a first "rough" positioning of the calibration device commanding the carriage 50 so as to meet the first set of reference ranges and a "fine" positioning controlling the one or more first actuators and/or the one or more second actuators so as to meet the second set of reference ranges, ensuring in this way a quick positioning/orientation of the calibration device without in any way compromising the accuracy of the positioning/orientation.

Figure 3:
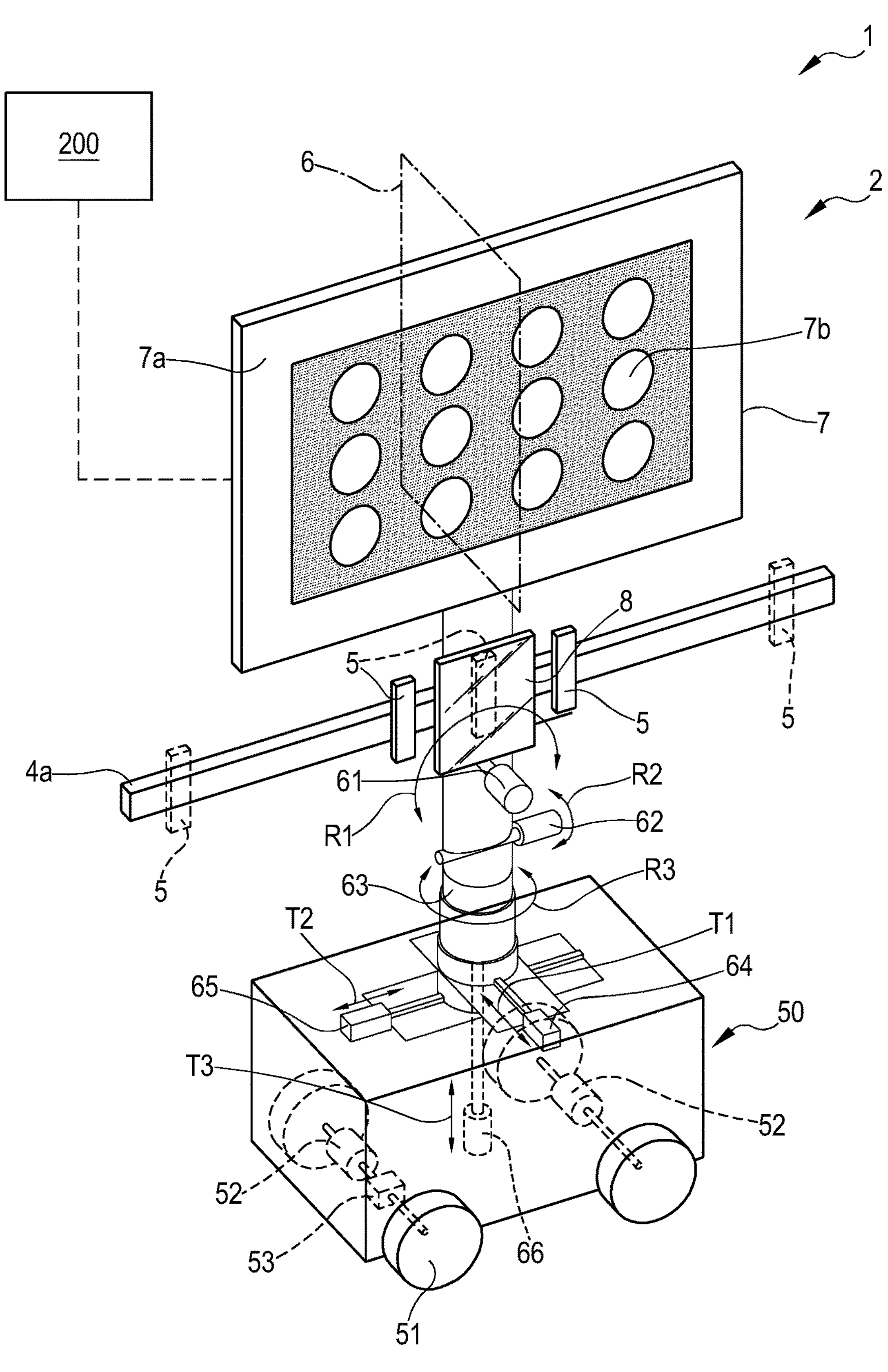
FIG. 3 is a perspective view of a calibration device usable in the test bay of FIGS. 1, 2 and 2A.
Figure 10:
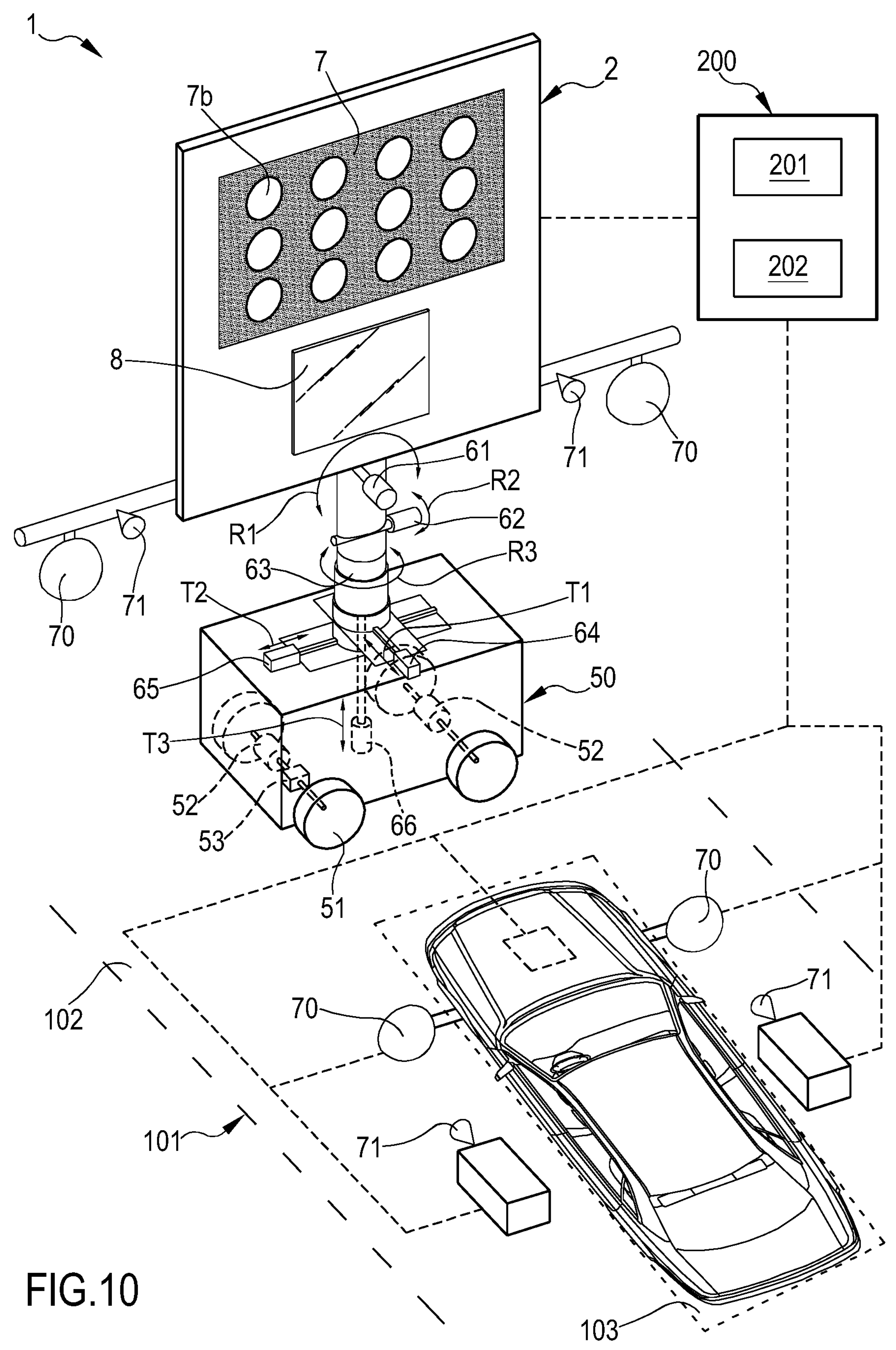
FIG. 10 is a schematic view of a further embodiment of a vehicle test bay using a calibration apparatus for one or more vehicular sensors, according to aspects of the invention.

It should be noted that although the correction procedure has been described with reference to the positioning method and apparatus of which in FIGS. 1-3, said correction procedure and relative means (electronic processor 201, calibration device 2 with one or more of the first positioners 61, 62 and 63, one or more of the second positioners 64, 65, 66 and carriage 50) may also be used in solutions wherein the step of determining data representative of the position and orientation of the calibration device 2 with respect to the vehicle V is performed with any known methodology other than that above described. For example, referring to FIG. 10 where the same above-described components are identified with the same numbers, the apparatus 1 includes one or more devices 2: for example, the support frame 4 of each device 2 (in FIG. 10 is not limiting represented one calibration device 2) may engage one or more target 70 (for example two- or three-dimensional targets provided with a plurality of reference elements of known position and geometry), while the vehicle V in the zone 103 may support one or more cameras 71 on each side of the vehicle; alternatively the cameras 71 may be placed on each side of the vehicle V in known position with respect to the vehicle itself exactly as shown in FIG. 10 i.e. a right camera placed on the floor in a known position with respect to the right side of the vehicle and a left camera in known position with respect to the left side of the vehicle itself. The cameras 71, observing the targets 70, may detect images of the targets 70 that once transmitted to the processing unit 201 allow the latter to determine the relative position between the calibration device 2 and the vehicle V. Alternatively, it may be the support frame to carry one or more cameras 71 configured for framing and seeing one or more targets 70 (for example two- or three-dimensional targets provided with a plurality of reference elements of known position and geometry) carried by the vehicle: also in this case from the observation of the targets known 70 by the cameras 71, the electronic processor 201 that communicates and receives data from the cameras themselves may trace back the relative position between calibration device and vehicle V present in the area 103. Subsequently, determined the relative position between calibration device and vehicle V present in the area 103 it may be executed by the electronic processor programmed for this purpose the correction procedure described above by controlling the movement of the carriage 50, where present, for example controlling the at least one motor 52 and eventually the steering gear 53 so as to position the device 2 in front of or behind the cars. In addition or in alternative, the correction procedure may also comprise commanding one or more first positioners 61, 62 and 63 and/or one or more second positioners 64, 65 and 66 to automatically bring the calibration device to the exact orientation and position with respect to the vehicle V. The combination of use of the carriage and of one or more of the first or second positioners allows the electronic processor to bring the device 2 from a starting position (also relatively distant from the vehicle V) to the optimal position and orientation for the calibration of the sensors on-board of the vehicle itself.

Once appropriately positioned, the device 2 that comprises also in this case one or more calibration elements (as for example the panel 7 and/or the reflective panel 8) may be used for the calibration of sensors on-board of the vehicle V. For this purpose, the processing unit 201 may be also configured for communicating with a control unit 300 of the vehicle V and signaling to the latter the reaching of the position and orientation useful for the calibration of the sensors of the vehicle.

The invention claimed is:

1. A method of verifying a positioning of a calibration device for one or more vehicular sensors of a vehicle, wherein the vehicle is positioned in a respective control area and wherein the calibration device is positioned in front of or behind the vehicle, said method being implemented by a computerized system including at least one electronic processor and configured for determining:

data representative of a position and orientation of the vehicle with respect to a common reference system, data representative of a position and orientation, with respect to said common reference system, of at least one location target directly or indirectly fixed to a base surface in front of or behind the vehicle, between the control area and the calibration device, said method of verifying the positioning comprising the steps of:

obtaining one or more detections of the at least one location target using a sensor fixed to said calibration device, obtaining data representative of current position and orientation of the calibration device with respect to said common reference system based on:

said data representative of position and orientation, in the common reference system, of the at least one location target, and said one or more detections of the at least one location target obtained by the sensor fixed to said calibration device, verifying whether the current position and orientation of the calibration device are correct or not based on:

said data representative of the current position and orientation of the calibration device in said common reference system, said data representative of the position and orientation of the vehicle in the common reference system, and reference values or ranges establishing a correct position and orientation of the calibration device with respect to the vehicle.

2. The method according to claim 1, wherein the sensor fixed to said calibration device comprises one or more optical sensors fixed to the calibration device, and wherein:

the step of obtaining one or more detections of the at least one location target using a sensor fixed to said calibration device includes obtaining one or more images of the at least one location target using said one or more optical sensors fixed to said calibration device, said step of obtaining data representative of the current position and orientation of the calibration device with respect to said common reference system is performed based on determining:

said data representative of position and orientation, in the common reference system, of the at least one location target, and said one or more images of the at least one location target obtained from said one or more optical sensors fixed to said calibration device.

3. The method according to claim 2, comprising determining data representative of a relative position and orientation of the calibration device with respect to the at least one location target based on:

said one or more detections of the at least one location target obtained from the sensor fixed to said calibration device, or said one or more images of the at least one location target obtained from said one or more optical sensors fixed to said calibration device;

and wherein the step of obtaining data representative of the current position and orientation of the calibration device with respect to said common reference system is performed based on:

said data representative of the position and orientation, in the common reference system, of said at least one location target, and said data representative of the relative position and orientation of the calibration device with respect to at least one location target.

4. The method according to claim 3, wherein the at least one location target comprises two or more location targets and wherein said method comprises:

obtaining one or more detections of two or more location targets directly or indirectly fixable to the base surface in front of the vehicle, between the control area and the calibration device; or obtaining one or more detections of two or more location targets directly or indirectly fixable to the base surface behind the vehicle, between the control area and the calibration device.

5. The method according to claim 2, wherein the calibration device comprises a support frame and wherein said one or more optical sensors are constrained to the support frame, each optical sensor being arranged and oriented so that a field of view of said optical sensor frames at least one of: the at least one location target;

all the location targets in front of the vehicle, or all the location targets behind the vehicle; and wherein:

the step of obtaining one or more detections of the at least one location target using a sensor fixed to said calibration device comprises obtaining one or more images of all the location targets using said one or more optical sensors fixed to said calibration device, said step of obtaining data representative of the current position and orientation of the calibration device with respect to said common reference system is performed based on determining:

said data representative of the position and orientation, in the common reference system, of all location targets, and said one or more images of all the location targets obtained from said one or more optical sensors fixed to said calibration device.

6. The method according to claim 5, wherein each of said one or more optical sensors is positioned centrally at a vertical centerline plane of the support frame of the calibration device.

7. The method according to claim 5, wherein if, following said step of verifying whether the current position and orientation of the calibration device are correct or not, it is determined that the current position and/or orientation of the calibration device is incorrect, the method further comprises:

commanding a correction procedure bringing the current position and orientation of the calibration device to be correct;

wherein verifying whether the current position and orientation of the calibration device are correct or not includes comparing measured values of one or more location parameters with respective reference values or ranges, and wherein the method further comprises:

commanding a correction procedure that, if a discrepancy has been detected between one or more measured values of said one or more location parameters and their respective reference values or ranges, brings the one or more measured values of the one or more location parameters to meet their respective reference values or ranges.

8. The method according to claim 7, wherein the support frame carries one or more calibration elements, wherein each calibration element is pivotally constrained with respect to the support frame itself about one or more axes of rotation, and translationally constrained with respect to the support frame along one or more axes of translation, wherein an angular movement about the one or more rotational axes is given by one or more first automatic positioners controlled by the electronic processor and wherein a translational movement along the one or more axes of translation is given by one or more second automatic positioners controlled by the electronic processor;

and/or wherein the support frame is carried by or comprises a carriage having one or more locomotion elements, and at least one motor connected to the one or more locomotion elements, wherein the electronic processor is configured for controlling the one or more locomotion elements and/or the at least one motor and moving the carriage and thus said calibration device with respect to the vehicle present in the control area;

and wherein the correction procedure performed by the electronic processor includes at least one of: (a):

commanding the angular movement of each calibration element about the one or more axes of rotation by acting on said one or more first automatic positioners, and/or the translational movement along the one or more translation axes by acting on said one or more second automatic positioners; and/or commanding the carriage in order to position the calibration device in front of or behind the vehicle;

wherein, as a result of the angular and/or translational movement and/or the positioning performed by the carriage, there are no longer discrepancies between one or more measured values of the location parameters and the respective reference values or ranges, and/or (b)

commanding the carriage for performing a first positioning and orientation of the calibration device with respect to the vehicle, and once the first positioning and orientation has been performed, commanding one or more of the first positioners and/or one or more of the second positioners in order to carry out a second positioning and orientation of the calibration device or each of a set of calibration members carried by the latter, wherein the second positioning and orientation is such that there are no longer discrepancies between one or more measured values of the location parameters and the respective reference values or ranges.

9. The method according to claim 1, wherein each of said location targets is of planar shape and has an exposed surface provided with a plurality of prefixed graphic elements, each of the prefixed graphic elements having known position and orientation on said exposed surface.

10. The method according to claim 1, wherein two or more location targets are attached directly or indirectly to the base surface between the control area and the calibration device, the two or more location targets being spaced apart and aligned with each other.

11. The method according to claim 1, wherein the vehicle present in the control area has an advanced guidance system (ADAS) comprising at least one ADAS sensor, wherein the calibration device comprises a calibration element of the ADAS sensor;

wherein the ADAS sensor comprises one or more of:

an ADAS camera, wherein the calibration element comprises a calibration panel having, on a surface oriented to face the ADAS camera, a plurality of graphical elements of known position, orientation, and geometry, and wherein the calibration panel is positionable such that said ADAS camera frames in its field of view said calibration panel, and an ADAS radar, wherein the calibration element comprises a reflective panel configured to reflect electromagnetic waves emitted by said ADAS radar to calibrate said ADAS radar.

12. The method according to claim 11, wherein obtaining data representative of the current position and orientation of the calibration device in said common reference system includes determining, with respect to said common reference system, measured values of one or more location parameters chosen from among:

height of the calibration panel relative to the base surface, height of the reflective panel relative to the base surface, height of other calibration element carried by the calibration device and useful for calibrating an ADAS sensor relative to the base surface, distance of a prefixed point of the calibration panel from a prefixed characteristic element of the vehicle present in the control area, distance of a prefixed point of the reflective panel from a prefixed characteristic element of the vehicle present in the control area, distance of a prefixed point of other calibration element carried by the calibration device and useful for calibrating an ADAS sensor from a prefixed characteristic element of the vehicle present in the control area, distance of a predetermined point of the calibration panel from a vehicle front axle;

distance of a predetermined point of the reflective panel from a vehicle front axle;

distance of a predetermined point of other calibration element carried by the calibration device and useful for calibrating an ADAS sensor from a vehicle front axle;

one or more tilt angles of the calibration panel with respect to the common reference system or to a reference system of the vehicle obtainable from the common reference system, one or more tilt angles of the reflective panel with respect to the common reference system or to a reference system of the vehicle obtainable from the common reference system; and one or more tilt angles of other calibration element carried by the calibration device and useful for calibrating an ADAS sensor with respect to the common reference system or to a reference system of the vehicle obtainable from the common reference system.

13. The method according claim 1, comprising the step of determining data representative of the position and orientation of the vehicle with respect to the common reference system;

wherein determining data representative of the position and orientation of the vehicle with respect to the common reference system involves determining for each side of the data representative of the position and orientation with respect to that common reference system of at least one characteristic element using for each side of the vehicle:

one or more reference targets, in a fixed position relative to the base surface, lateral to the control area where the vehicle is positioned, and one or more image detectors positioned laterally relative to the control area;

wherein each of said image detectors is positioned proximate to a respective reference target, and wherein each pair formed by an image detector and the respective reference target is configured so that the image detector has a field of view framing both the respective reference target and at least one portion of the side of the vehicle in said control area.

14. The method according to claim 13, wherein said step of determining for each side of the vehicle data representative of the position and orientation of at least one characteristic element of the vehicle with respect to the common reference system, also includes, for each pair formed by image detector and respective reference target:

detecting with said image detector one or more images of said at least one portion of the side of the vehicle, detecting with said image detector one or more images of the respective reference target, and obtaining data representative of the position and orientation of said at least one characteristic element of the vehicle in the common reference system based on:

said one or more images of said at least one portion of the side of the vehicle, and said one or more images of the respective reference target.

15. The method according to claim 14, wherein said step of determining for each side of the vehicle data representative of position and orientation of at least one characteristic element of the vehicle, with respect to the common reference system also includes, for each pair formed by image detector and respective reference target:

detecting with said image detector one or more images of said at least one portion of the side of the vehicle, detecting with said image detector one or more images of the respective reference target, and obtaining data representative of the position and orientation of said at least one characteristic element of the vehicle in the common reference system based on:

said data representative of the position and orientation, in said common reference system, of the reference target of the pair formed by image detector and respective reference target, said one or more images of said at least a portion of the side of the vehicle, and said one or more images of the respective reference target.

16. The method according to claim 13, wherein determining data representative of the position and orientation of said at least one characteristic element of the vehicle in the common reference system provides, for each pair formed by image detector and respective reference target, to:

in a first instance, determining data representative of the position and orientation of the characteristic element of the vehicle with respect to the image detector based on the one or more images of said at least one portion of the side of the vehicle, as well as determining data representative of the position and orientation of the reference target with respect to the image detector based on said one or more images of the respective reference target, and subsequently, determining data representative of the position and orientation of said at least one characteristic element of the vehicle in the common reference system based on what was determined in first instance and the data representative of the position and orientation, in said common reference system, of the reference target of the pair formed by image detector and respective reference target.

17. The method according to claim 13, wherein the computer knows position and orientation, in said common reference system, of the one or more reference targets placed laterally to each longitudinal side of the control area.

18. The method according to claim 13, wherein each image detector comprises two or more cameras mounted in a known and fixed relative position on a same rigid support, such that a distance between the two or more cameras and the relative orientation of optical axes of the two or more cameras of the same image detector are predetermined and known, wherein the two or more cameras of the same image detector cooperate with each other capturing images of the same respective portion of the side of the vehicle, so that defining a multi-ocular stereo vision system, wherein at least one of the two cameras of the same image detector frames both the respective portion of the side of the vehicle and the respective reference target, wherein at least one of the two cameras of the same image detector frames both the respective side of the vehicle and the respective reference target and simultaneously captures both an image of the respective reference target and the respective portion of the side of the vehicle, wherein each reference target is a target having planar conformation having an exposed surface provided with a plurality of prefixed graphic elements, each of the prefixed graphic elements having known position and orientation on said exposed surface, wherein for each image detector is provided:

a plate shaped element, fixed or fixable on the base surface at a position adjacent to one side of the vehicle, having an upper surface where the respective reference target is arranged, a column superiorly coupled to the plate shape element and emerging from the plate shape element, wherein said image detector is stably coupled to said column and is configured so as to capture the image of the reference target present on an underlying plate shape element;

wherein said column defines the rigid support to which the two or more cameras of the same image detector are fixed, said cameras being placed in spaced apart positions from each other.

19. The method according to claim 1, wherein the method comprises an initial procedure of determining data representative of the position and orientation, in said common reference system, of the one or more reference targets placed laterally to each longitudinal side of the control area;

wherein said initial procedure includes one of:

observing each of said one or more reference targets with one or more dedicated image detectors, placed in known position and orientation in the common reference system, detecting, with said one or more dedicated image detectors, respective one or more images of the reference targets, and determining, based on the position and orientation in the common reference system of said one or more dedicated image detectors and of the one or more images detected by them of each reference target, data representative of the position and orientation in said common reference system of the one or more reference targets placed on each longitudinal side of the control area;

or placing one or more known common targets at a known location and orientation with respect to the common reference system, said one or more common targets being viewable by image detectors, detecting with said one or more image detectors respective images of the one or more common targets, determining, based on the images detected by the image detectors of the one or more common targets, data representative of the position and orientation in the common reference system of said one or more image detectors, deriving data representative of the position and orientation of each reference target in the common reference system based on one or more images of the respective reference target taken by the corresponding image detector of each pair.

20. The method according to claim 1, wherein determining data representative of the position and orientation of said vehicle with respect to the common reference system includes obtaining data representative of the position and orientation in the common reference system of at least one characteristic element for each side of the vehicle, wherein said at least one characteristic element includes one or more of:

a right front wheel of the vehicle, a right rear wheel of the vehicle, a left front wheel of the vehicle, and a left rear wheel of the vehicle, wherein determining the data representative of position and orientation data of said at least one characteristic element of the vehicle, with respect to the common reference system, includes determining with respect to said common reference system measured values assumed by a set of positional parameters chosen from among:

position and orientation of a right front wheel of the vehicle, position and orientation of a right rear wheel of the vehicle, position and orientation of a left front wheel of the vehicle, position and orientation of a left rear wheel of the vehicle, position and orientation of a left front wheel and a right front wheel of the vehicle, position and orientation of a left rear wheel and a right rear wheel of the vehicle, and position and orientation of a left front wheel and a right front wheel of the vehicle, and position and orientation of a right rear wheel and a left rear wheel of the vehicle;

and wherein determining data representative of the position and orientation of said vehicle with respect to the common reference system includes determining, with respect to said common reference system, a measured values assumed by a set of additional positional parameters chosen from among:

position and orientation of a vehicle rear axle, position and orientation of a longitudinal centerline of said vehicle, position and orientation of a thrust axis of said vehicle, position of a predetermined element of the vehicle or fixed to the vehicle, position and orientation of each front wheel of the vehicle and position and orientation of each rear wheel of said vehicle, position and orientation of a vehicle front axle and position and orientation of a vehicle rear axle, position and orientation of the longitudinal centerline of said vehicle, and position and orientation of the thrust axis of said vehicle, position and orientation of each front wheel of said vehicle, position and orientation of each rear wheel of said vehicle, position and orientation of a front axle of said vehicle, position and orientation of a rear axle of said vehicle, and position and orientation of each front wheel of said vehicle, position and orientation of each rear wheel of said vehicle, position and orientation of a front axle of said vehicle, position and orientation of a rear axle of said vehicle, position and orientation of the longitudinal centerline of said vehicle, position and orientation of the thrust axis of said vehicle.

21. The method according to claim 20, including additional steps of:

determining a reference system fixed to the vehicle having at least two reference axes lying on a vertical plane through the longitudinal centerline of the vehicle and a third axis perpendicular to said vertical plane, and re-calculating the measured values of one or more of said set of positional parameters and said set of additional positional parameters with respect to the reference system fixed to the vehicle;

said method also providing for performing an alignment procedure that involves:

comparing measured values of one or more of said set of positional parameters and said set of additional positional parameters determined with respect to the reference system fixed to the vehicle with a corresponding set of values or reference range, determining possible discrepancies between measured values of one or more of said set of positional parameters and said set of additional positional parameters and respective one or more reference values or ranges, and in case there are discrepancies between measured values of one or more of said set of positional parameters and said set of additional positional parameters and respective one or more reference values or ranges, execute a correction procedure that brings the measured values of one or more of said set of positional parameters and said set of additional positional parameters determined with respect to the reference system integral to the vehicle to meet the respective one or more optimal values or ranges.

22. The method according to claim 1, wherein determining data representative of the position and orientation, in said common reference system, of each location target comprises performing a procedure comprising:

observing each of the said one or more location targets with one or more dedicated image detectors, placed at known position and orientation in the common reference system, detecting, with said one or more dedicated image detectors, respective one or more images of each location target, and determining, based on the representative position and orientation in the common reference system of said one or more dedicated image detectors and the respective one or more images detected by them of each of the location targets, the data representative of the position and orientation in said common reference system of each of the location targets;

wherein said one or more dedicated image detectors are positioned in one or more of an elevated area above a top of the vehicle and a position capable of framing in their field of view each of the location targets;

wherein determining position and orientation, in said common reference system, of each location target, includes performing a procedure comprising:

placing one or more known common targets at a known location and orientation with respect to the common reference system, said one or more known common targets being viewable by image detectors, detecting with said one or more image detectors respective images of the one or more known common targets, determining, based on the images detected by the image detectors of the one or more common targets, data representative of the position and orientation in the common reference system of said one or more image detectors, and deriving data representative of the position and orientation of each location target in the common reference system based on one or more images of that location target taken by the one or more image detectors;

wherein said one or more common targets are placed in one or more of an elevated area above the top of the vehicle and a position capable of being framed in the field of view of each of the imaging detectors.

23. The method according to claim 1, wherein said step of determining data representative of the position and orientation, in said common reference system, of at least one location target is performed one time during initial calibration of the equipment and not repeated for each positioning of a calibration device with respect to the respective vehicle positioned in the control area;

and/or wherein an initial procedure of determining data representative of the position and orientation, in said common reference system, of one or more reference targets placed laterally to each longitudinal side of the control area is performed one time during the initial calibration of the equipment and not repeated for each positioning of a calibration device with respect to the respective vehicle positioned in the control area.

* * * * *